US006853922B2

(12) United States Patent
Stark

(10) Patent No.: US 6,853,922 B2
(45) Date of Patent: Feb. 8, 2005

(54) SYSTEM FOR INFORMATION EXTRACTION FROM GEOLOGIC TIME VOLUMES

(76) Inventor: Tracy Joseph Stark, 5021 Sparrows Point, Plano, TX (US) 75023

(*) Notice: Subject to any disclaimer, the term of this patent is extended or adjusted under 35 U.S.C. 154(b) by 358 days.

(21) Appl. No.: 10/188,908

(22) Filed: Jul. 3, 2002

(65) Prior Publication Data

US 2003/0023383 A1 Jan. 30, 2003

Related U.S. Application Data

(63) Continuation-in-part of application No. 09/909,694, filed on Jul. 20, 2001, and a continuation-in-part of application No. 09/952,657, filed on Sep. 12, 2001, now Pat. No. 6,708,118.

(51) Int. Cl.$^7$ .................................................. G01V 1/28
(52) U.S. Cl. .......................................... 702/14; 702/16
(58) Field of Search ................................... 702/14, 16

(56) References Cited

U.S. PATENT DOCUMENTS

| | | |
|---|---|---|
| 4,464,569 A | 8/1984 | Flaum |
| 4,821,164 A | 4/1989 | Swanson |
| 5,056,066 A | 10/1991 | Howard |
| 5,153,858 A | 10/1992 | Hildebrand |
| 5,233,569 A | 8/1993 | Beasley et al. |
| 5,251,184 A | 10/1993 | Hildebrand et al. |
| 5,282,384 A | 2/1994 | Holbrook |
| 5,394,325 A | 2/1995 | Schneider, Jr. |
| 5,513,150 A | 4/1996 | Sicking et al. |
| 5,623,928 A | 4/1997 | Wright et al. |

(List continued on next page.)

FOREIGN PATENT DOCUMENTS

WO    WO 02/099464 A1 * 12/2002 ............ G01V/1/30

OTHER PUBLICATIONS

Barbara J. Radovich and R. Burnet Oliveros; " 3–D sequence interpretation of seismic instantaneous attributes from the Gorgon Field"; The Leading Edge; Sep. 1998; p. 1286–1293; 17; No. 9.

R. E. Sheriff and D. Frye and F. Koehler and M. T. Taner; " Extraction and Intepretation of the Complex Seismic Trace: Part II. Geologic Interpretation"; Geophysics; abstract from 1976 SEG meeting; p. 181; vol. 42; No. 1.

Umberto Spagnolini; "2–D phase unwrapping and phase aliasing"; Geophysics; Sep. 1993; p. 1324–1334; vol. 58, No. 9.

Tracy J. Stark; "Surface slice generation and interpretation: A review"; The Leading Edge; Jul. 1996; p. 818–819; 17; No. 7.

Brochure; VoxelGeo—A volume–based Visualization and Interpretation System; Paradigm Geophysical Ltd.; 1998.

Larry R. Beyer; "rapid 3–D screening with seismic terrain: deepwater Gulf of Mexico examples"; The Leading Edge; Apr. 2001; p. 386–395; 20; No. 4.

(List continued on next page.)

*Primary Examiner*—Marc S. Hoff
*Assistant Examiner*—Anthony Gutierrez

(57) ABSTRACT

In a preferred embodiment the invention comprises a system for analyzing seismic data which includes selecting a geologic time volume for a subsurface region of interest and selecting a procedure for generating a derived data volume based on the geologic time volume. The selected procedure is used to calculate the derived data volume and the derived data volume is stored in a data storage medium. In specific embodiments of the invention, the derived data volumes include but are not limited to difference volumes, discontinuity volumes, fault volumes, unconformity volumes, throw volumes, heave volumes, dip magnitude volumes, dip azimuth volumes, strike volumes, surface normal volumes, closure volumes, spill point volumes, isopach volumes and isopach anomaly volumes.

182 Claims, 13 Drawing Sheets

U.S. PATENT DOCUMENTS

| | | | |
|---|---|---|---|
| 5,724,309 A | 3/1998 | Higgs et al. | |
| 5,838,634 A | 11/1998 | Jones et al. | |
| 5,870,691 A | 2/1999 | Partyka et al. | |
| 5,894,417 A | 4/1999 | Dorn | |
| 5,963,508 A | 10/1999 | Withers | |
| 5,966,672 A | 10/1999 | Knupp | |
| 5,987,125 A | 11/1999 | Stringer et al. | |
| 5,995,448 A | 11/1999 | Krehbiel | |
| 5,995,907 A | 11/1999 | Van Bemmel et al. | |
| 5,999,485 A | 12/1999 | Anstey et al. | |
| 6,011,557 A | 1/2000 | Keskes et al. | |
| 6,012,018 A | 1/2000 | Hornbuckle | |
| 6,018,497 A | 1/2000 | Gunasekera | |
| 6,018,498 A | 1/2000 | Neff et al. | |
| 6,044,328 A | 3/2000 | Murphy et al. | |
| 6,070,125 A | 5/2000 | Murphy et al. | |
| 6,078,869 A | 6/2000 | Gunasekera | |
| 6,092,026 A | 7/2000 | Bahorich et al. | |
| 6,131,071 A | 10/2000 | Partyka et al. | |
| 6,138,075 A | 10/2000 | Yost | |
| 6,138,076 A | 10/2000 | Graf et al. | |
| 6,150,973 A | 11/2000 | Pritt | |
| 6,151,555 A | 11/2000 | Van Bemmel et al. | |
| 6,201,884 B1 | 3/2001 | Van Bemmel et al. | |
| 6,374,201 B1 * | 4/2002 | Grizon et al. | 703/10 |
| 6,393,366 B1 | 5/2002 | Saggaf | |
| 6,571,177 B1 * | 5/2003 | Hardy | 702/16 |
| 2003/0055598 A1 * | 3/2003 | Gillard et al. | 702/156 |
| 2003/0231548 A1 * | 12/2003 | Gillard et al. | 367/40 |

OTHER PUBLICATIONS

F. Koehler and M. T. Taner and R. E. Sheriff and D. Frye; "Extraction and Interpretation of the Complex Seismic Trace: Part I. Computational Procedures"; Geophysics; absract from 1976 SEG meeting; p. 162; vol. 42; No. 1.

William A. Wescott and William N. Krebs and Paul J. Sikora and Paul J. Boucher and Jeffrey A. Stein; "Modern applications of biostratigraphy in exploration and production"; The Leading Edge; Sep. 1998; p. 1204–1210;17; No. 9.

G. F. Carballo and P. W. Fieguth; "Multiresolution Network Flow Phase Unwrapping"; International Geoscience and Remote Sensing Symposium; 2000; 3 pages.

Geoffrey A. Dorn; "Modern 3–D seismic interpretation"; The Leading Edge; Sep. 1998; p. 1262–1272; 17; No. 9.

Hongliu Zeng and Tucker F. Hentz and Lesli J. Wood; "Stratal slicing of Miocene–Pliocene sediments in Vermilion Block 50–Tiger Shoal Area, offshore Louisiana"; The Leading Edge; Apr. 2001; p. 408–418; 20; No. 4.

P. R. Vail and R. M. Mitchum, Jr.; "Seismic Stratigraphy and Global Changes of Sea Level, Part 1: Overview"; Seismic Stratigraphy–applications to hydrocarbon exploration; AAPG Memoir 26; Dec. 1977; p. 51–52.

R. M. Mitchum, Jr. and P. R. Vail and S. Thompson, III; "Seismic Stratigraphy and Global Changes of Sea Level, Part 2: The Depositional Sequence as a Basic Unit for Stratigraphic Analysis"; Seismic Stratigraphy–applications to hydrocarbon exploration; AAPG Memoir 26; Dec. 1977; p. 53–62.

M. T. Taner and R. E. Sheriff; "Application of Amplitude, Frequency, and Other Attributes to Stratigraphic and Hydrocarbon Determination"; Seismic Stratigraphy—applications to hydrocarbon exploration; AAPG Memoir 26; Dec. 1977; p. 301–327.

Becky Leigh Wood; "Development of A Structural Framework from Seismic Reflection Data"; University of Texas Master's thesis; May 1988; p. i–xviii and p. 1–102.

E.Poggiagliolmi and A.J. Berkhout and M. M. Boone; "Phase Unwrapping, Possibilities and Limitations"; Geophysical Prospecting; 30 ;1982; p. 281–291. Reprinted in Seismic Source Signature Estimation and Measurement; Geophysics Reprint Series No. 18; Society of Exploration Geophysicists; 1996; p. 250–260.

Toshifumi Matsuoka and Tad J. Ulrych; "Phase Estimation Using the Bispectrum"; Proceedings of the IEEE; 72; 1980; p. 1403–1411. Reprinted in Seismic Source Signature Estimation and Measurement; Geophysics Reprint Series No. 18; Society of Exploration Geophysicists; 1996; p. 261–269.

J. P. Lindsey; "Measuring wavelet phase from seismic data"; (This article is based on Lindsey's 1987 Fall Distinguished Lecture, "Wavelet extraction from seismic data with no phase assumption," presented to many SEG Sections.) Reprinted in Seismic Source Signature Estimation and Measurement; Geophysics Reprint Series No. 18; Society of Exploration Geophysicists; 1996; p. 294–300.

J. P. Lindsey; "A note on phase unwrapping"; Seismic Source Signature Estimation and Measurement; Geophysics Reprint Series No. 18; Society of Exploration Geophysicists; 1996; p. 301–307. (Original contribution to this volume.).

N. S. Neidell; "Could the processed seismic wavelet be simpler than we think?"; Geophysics; vol. 56; No. 5; May 1991; p. 681–690; 7 Figs., 1 table. Reprinted in Seismic Source Signature Estimation and Measurement; Geophysics Reprint Series No. 18; Society of Exploration Geophysicists; 1996 p. 308–317.

A. P. Shatilo; "Seismic Phase Wrapping: Methods, Results, Problems"; Geophysical Prospecting; 40; 1992; p. 211–225. Reprinted in Seismic Source Signature Estimation and Measurement; Geophysics Reprint Series No. 18; Society of Exploration Geophysicists; 1996; p. 318–332.

Umberto Spagnolini; "2–D phase unwrapping and phase aliasing"; Geophysics; vol. 58; No. 9; Sep. 1993; p. 1324–1334; 9 Figures. Reprinted in Seismic Source Signature Estimation and Measurement; Geophysics Reprint Series No. 18; Society of Exploration Geophysicists; 1996; p. 333–343.

Sven Treitel and Enders A. Robinson; "Maximum entropy spectral decomposition of a seismogram into its minimum entropy component plus noise"; Geophysics; vol. 46; No. 8; Aug. 1981; p. 1108–1115; 7 Figs. Reprinted in Seismic Source Signature Estimation and Measurement; Geophysics Reprint Series No. 18; Society of Exploration Geophysicsts; 1996; p. 344–352.

J. Longbottom and A. T. Walden and R. E. White; "Principles and Application of Maximum Kurtosis Phase Estimation"; Geophysical Prospecting; 36; 1988; p. 115–138. Reprinted in Seismic Source Signature Estimation and Measurement; Geophysics Reprint Series No. 18; Society of Exploration Geophysicists; 1996; p. 270–293.

Dennis C. Ghiglia and Mark D. Pritt; Two–Dimensional Phase Unwrapping—Theory, Algorithms, and Software; Chapter 1,2 and 3; 1998; Title page and pages v–xiv and p. 1–99; John Wiley & Sons, Inc.

Jon Claerbout; Chapter 2: Model fitting by least squares; Geophysics Exploration Mapping; Feb. 27, 1998; p. 31–66; Stanford University.

Hongliu Zeng and Stephen C. Henry and John P. Riola; "Stratal slicing. Part II: Real 3–D seismic data"; Geophysics; Mar.–Apr. 1998; p. 514–522; vol. 63; No. 2.

Hongliu Zeng and Stephen C. Henry and John P. Riola; "Stratal slicing, Part I: Realistic 3–D seismic model"; Geophysics; Mar.–Apr. 1998; p. 502–513; vol. 63; No. 2.

* cited by examiner

US 6,853,922 B2

SYSTEM FOR INFORMATION EXTRACTION FROM GEOLOGIC TIME VOLUMES

CROSS REFERENCE TO RELATED APPLICATIONS

This patent application is a Continuation-in-Part of U.S. patent application Ser. No. 09/909,694, having a filing date of Jul. 20, 2001, and titled "System for Multi-Dimensional Data Analysis". This patent application is also a Continuation-in-Part of U.S. patent application Ser. No. 09/952,657, having a filing date of Sep. 12, 2001, now U.S. Pat. No. 6,708,118, and titled "System for Utilizing Geologic Time Volumes".

BACKGROUND OF THE INVENTION

1. Field of the Invention

This invention is related to seismic data processing. More specifically, the invention relates to a system for organizing seismic data.

2. Background

Geophysical and geologic study of the subsurface structure of the earth continues to be an important field of endeavor for several reasons. The continued search for producing reservoirs of hydrocarbons, such as oil and gas, is a particularly important motivation for obtaining information about the earth's subsurface.

Conventional seismic surveying is generally performed by imparting energy to the earth at one or more source locations, for example, by way of a controlled explosion, mechanical impact or the like. Return energy is then measured at surface receiver locations at varying distances and azimuths from the source location. The travel time of energy from source to receiver, via reflections and refraction from interfaces of subsurface strata is indicative of the depth and orientation of the subsurface strata.

The generation of instantaneous phase sections derived from seismic data is referred to in an article by Taner and Sheriff included in AAPG Memoir 26 from 1977, in which it is stated:

"The instantaneous phase is a quantity independent of reflection strength. Phase emphasizes the continuity of events; in phase displays . . . every peak, every trough, every zero-crossing has been picked and assigned the same color so that any phase angle can be followed from trace to trace." And "Such phase displays are especially effective in showing pinchouts, angularities and the interference of events with different dip attitudes."

Various phase unwrapping techniques are known, including those disclosed in Ghiglia, Dennis C. and Pritt, Mark D., *Two-Dimensional Phase Unwrapping Theory, Algorithms, and Software,* John Wiley & Sons, Inc., New York, N.Y., 1998. Methods of obtaining topography from synthetic aperture radar data have also used phase unwrapping techniques.

A long felt need continues to exist, however, for improved systems for organizing, storing and displaying seismic information to assist in the analysis and interpretation of the subsurface structure and geology.

SUMMARY OF THE INVENTION

In a preferred embodiment the invention comprises a system for analyzing seismic data which includes selecting a geologic time volume for a subsurface region of interest and selecting a procedure for generating a derived data volume based on the geologic time volume. The selected procedure is used to calculate the derived data volume and the derived data volume is stored in a data storage medium. In specific embodiments of the invention, the derived data volumes include but are not limited to difference volumes, discontinuity volumes, fault volumes, unconformity volumes, throw volumes, heave volumes, dip magnitude volumes, dip azimuth volumes, strike volumes, surface normal volumes, closure volumes, spill point volumes, isopach volumes and isopach anomaly volumes.

DESCRIPTION OF THE PREFERRED EMBODIMENT

Figure 1:
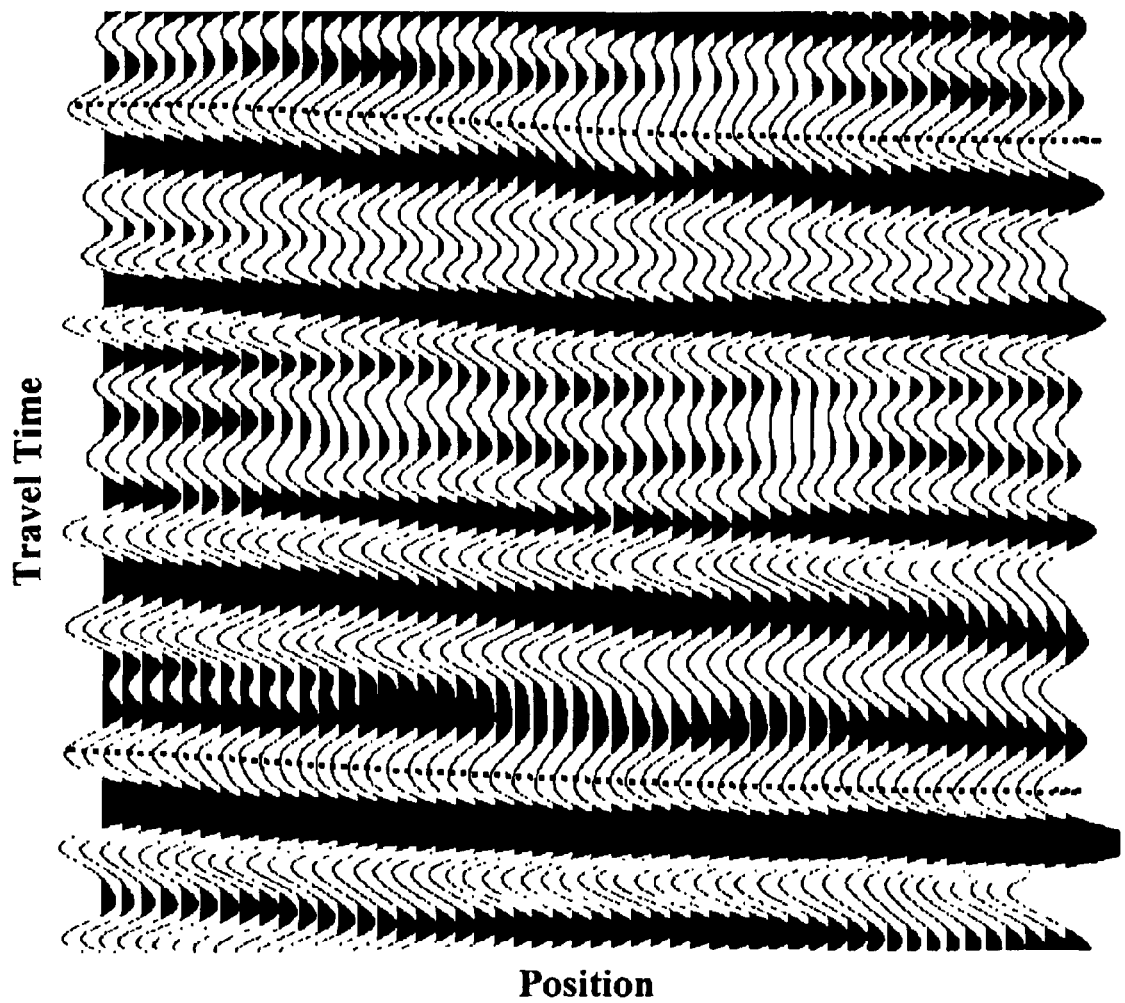
FIG. 1 shows a representative seismic data section.

FIG. 1 shows a representative seismic data section. For clarity, a two dimensional seismic data section is shown, although the invention described herein is applicable to three dimensional (3D) seismic data as well as to two dimensional (2D) seismic data, and the invention will be described herein primarily with reference to a 3D seismic data volume. Although the seismic data traces shown in FIG. 1 are shown as continuously sampled in the travel time direction, those of ordinary skill in the art will recognize that each seismic data trace is recorded by sampling the reflected seismic energy at discrete sample times at intervals typically ranging from 1 to 4 milliseconds. Although the following text generally describes the procedure in relationship to data in two way travel time, the procedures described herein are equally valid for seismic data which have been converted to depth.

U.S. patent application Ser. No. 09/909,694, having a filing date of Jul. 20, 2001, which patent application is incorporated herein by reference for all purposes, discloses methods for generating geologic time volumes. U.S. patent application Ser. No. 09/952,657, having a filing date of Sep. 12, 2001, which patent application is also incorporated herein by reference for all purposes, discloses methods for utilizing geologic time volumes. In a geologic time volume, geologic time values are stored in memory locations on a data storage medium. These geologic time values are estimates of the geologic time at which sediments were deposited. The goal of generating a geologic time volume is to have a representation of geologic time for corresponding sample points in a seismic data volume. The geologic time volume data are normally stored on a computer storage medium, such as a magnetic or optical disk, magnetic tape, computer random access memory or other storage media which may be read by a computer.

Typically, in generating a geologic time volume from a seismic data volume, the geologic time volume will have the same spatial dimensions as the seismic data volume. Each x, y and z data point in the seismic data volume (where x and y represent the in-line and cross line directions, and z represents the travel time or depth) will have a corresponding point in the geologic time volume. The seismic data volume might typically include 2000 cross lines and 2000 in-lines and extend for a depth of greater than 3000 time samples, for a total of 12,000,000,000 ($12 \times 10^9$) data sample points. The difference between the geologic time volume and the seismic data volume is that the value of the data point in the geologic time volume will be related to geologic time (or pseudo geologic time), rather than reflection amplitude (or other measured or calculated seismic attribute value).

Although a geologic time volume will typically be coextensive in space with a seismic data volume from which the geologic time volume was developed, data compression techniques may have been used in generating the geologic time volume, and uncompression techniques may be required to regenerate data points from a geologic time volume which correspond to data points in the seismic data volume.

In accordance with the present invention, a derived data volume is generated, directly or indirectly, from a geologic time volume. These derived data volumes include, but are not limited to, difference volumes, discontinuity volumes, fault volumes, unconformity volumes, throw volumes, heave volumes, dip magnitude volumes, dip azimuth volumes, strike volumes, surface normal volumes, closure volumes, point spill volumes, isopach volumes and isopach anomaly volumes. These derived data volumes may provide a better understanding of the geologic history as well as provide new insights into the potential locations of hydrocarbons.

Figure 2:
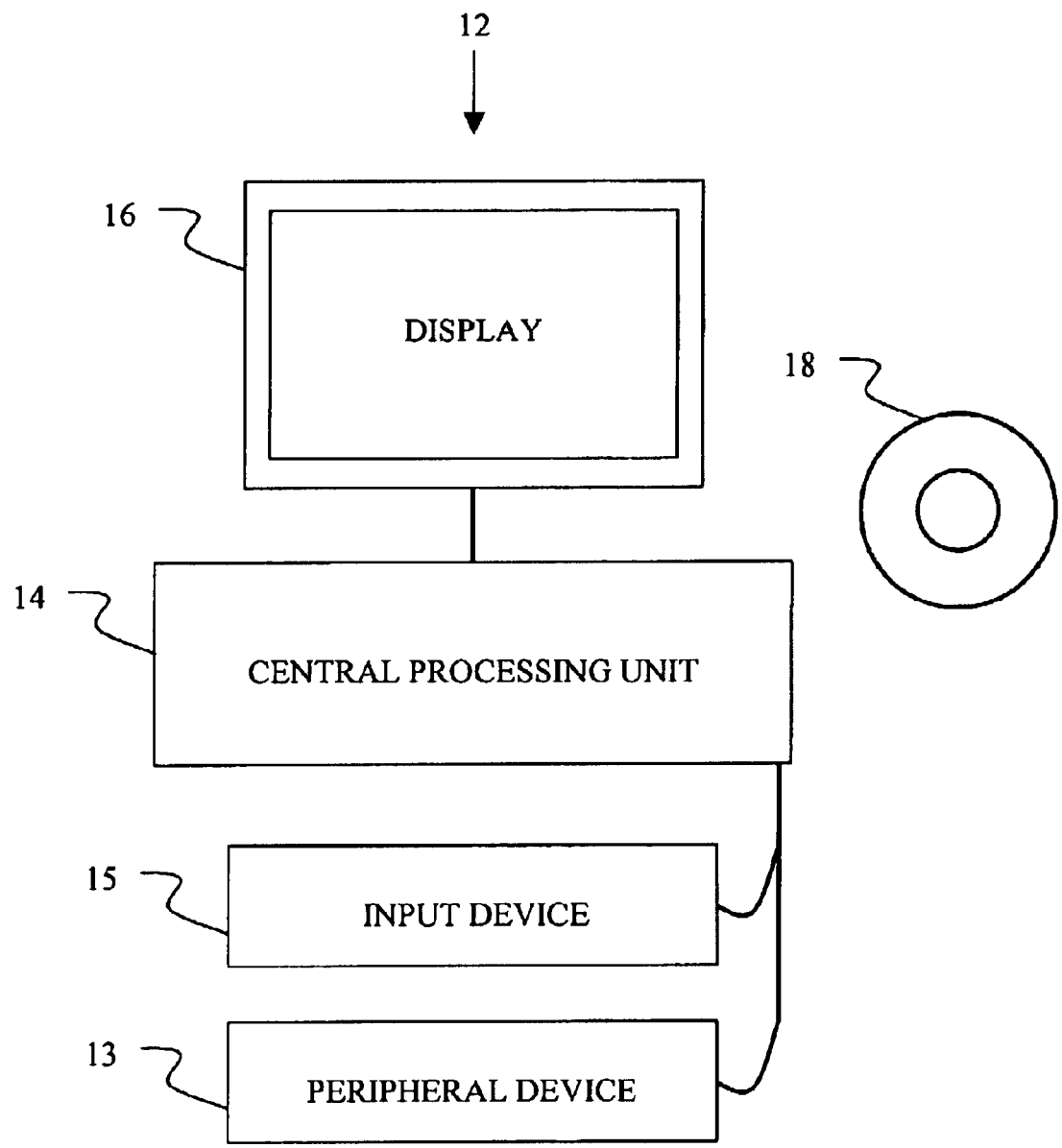
FIG. 2 shows a computer system useful for practicing the invention.

The process of the invention disclosed herein is most conveniently carried out by writing a computer program (or programs) to carry out the steps described herein on a work station or other conventional digital computer system of a type normally used in the industry. Data from (or based on) a geologic time volume are retrieved, and other operations performed by a suitable computer system, such as a personal computer or UNIX workstation. The generation of such a program may be performed by those of ordinary skill in the art based on the processes described herein. FIG. 2 shows such a conventional computer system 12 comprising a central processing unit 14, a display (monitor) 16, peripheral devices 13 (such as disk drives) and an input device 15 (such as a keyboard and mouse). The computer program for carrying out the invention will normally reside on a storage medium (not shown) associated with the central processing unit. Such computer program may be transported on a CD-ROM, a magnetic tape or magnetic disk, an optical disk, or other storage media, shown symbolically as storage medium 18.

Generally, seismic data are gathered by advancing a seismic source along a substantially straight line, and detecting the resulting seismic signals with sensors arranged in a rectangular grid, either on land or on cables pulled behind a vessel or laid on the sea floor. The direction in which the source advances is typically referred to as the "in-line" direction. The "cross line" direction is perpendicular to the in-line direction. The terms "in-line" and "cross line" are also generally used for specifying directions within the recorded seismic data corresponding to the recording pattern, and many of the calculations described herein are calculated between data points in a geologic time volume (or a data volume derived from a geologic time volume) positioned along lines extending through the volume in either the in line or cross line direction. However, the processes described herein are not limited to the directions typically referred to as in-line and cross line, but may be calculated along directions that are rotated with respect to the directions typically referred to as in-line and cross line. Accordingly, the term "in-line" as used hereinafter may refer to any selected direction, or displacement, extending substantially horizontally through a geologic time volume (or a data volume derived from a geologic time volume), and the corresponding "cross line" direction will be the direction perpendicular to the in line direction and extending substantially horizontally through the geologic time volume (or a data volume derived from a geologic time volume).

Figure 3:
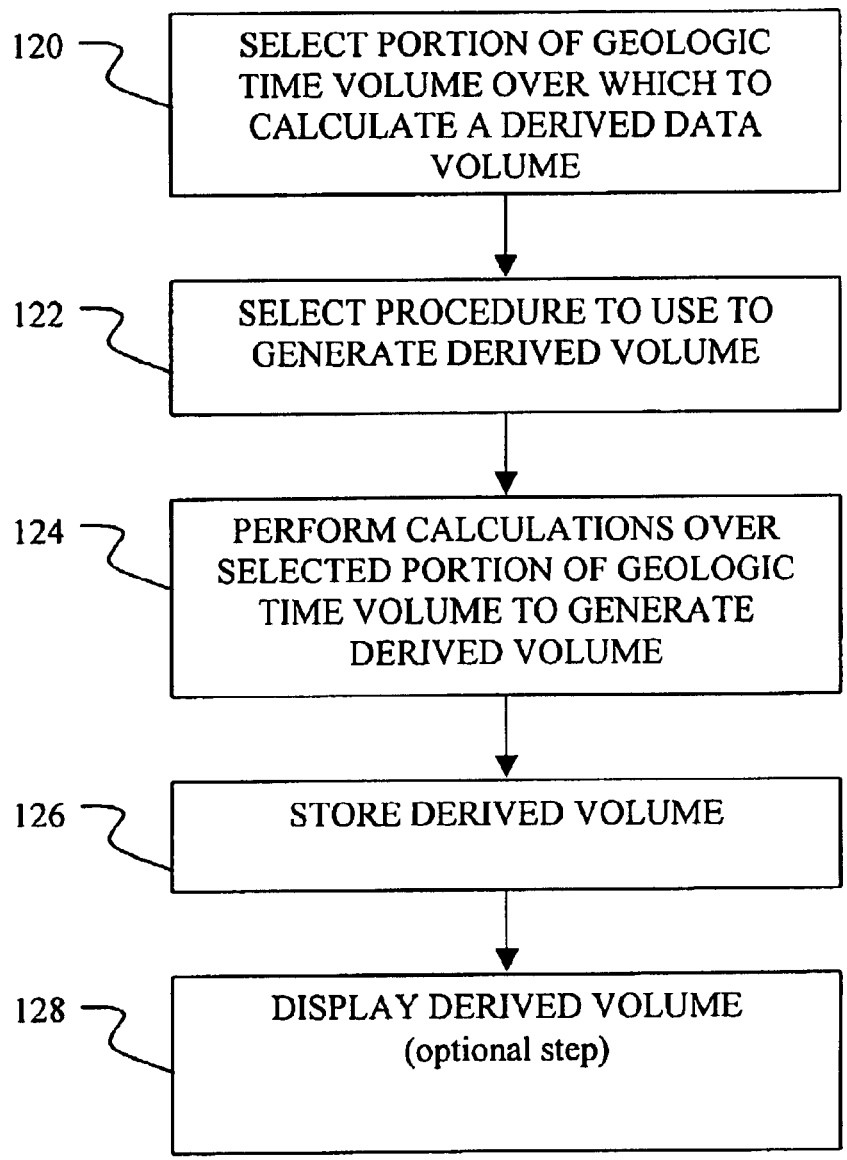
FIG. 3 is a flow diagram illustrating a process for performing various embodiments of the invention.

In accordance with the present invention, FIG. 3 is a flow diagram illustrating the steps which may be performed in implementing the invention in its various embodiments to generate the derived data volumes. In step 120 a portion of a geologic time volume is selected over which one or more derived data volumes will be generated. This portion could be the entire data volume, or could be limited, for example, by an in-line range, a cross line range, a travel time range, a depth range, a geologic time range, or any combination of the above. Next, in step 122, a procedure is selected which will be used to generate the derived data volume (or volumes). Such procedures include but are not limited to procedures further discussed herein. Some of the procedures can utilize previously generated derived volumes. As part of the procedure selection, the user can determine if the user desires to utilize previously generated derived data volumes to generate new derived data volumes, or use the geologic time volume and procedures that temporarily generate the derived data values that need to be utilized for generating the new derived data volumes. In step 124 the necessary calculations are performed using procedures selected in step 122 over the portion of the geologic time volume selected in step 120. In step 126 the derived data volume that results from step 124 is stored on a suitable storage device. This might be in computer random access memory (RAM) or on a magnetic disk or other computer storage device known to those skilled in the art. The resultant derived data volume may optionally be displayed in step 128 using data display and visualization methods known to those skilled in the art. Visualization programs contain the ability to modify color values (which include gray scale values), and opacity values to identify anomalous data points. VoxelGeo, a volume visualization software product marketed by Paradigm Geophysical (a company having an office in Houston, Tex.), is one such example of a well-known volume visualization package used in the petroleum industry.

Difference Volumes

A geologic time volume will normally comprise a plurality of data sample points extending horizontally in the in-line and cross line directions, and also extending vertically in the time direction. For purposes of the following discussion, these data sample points will be assumed to be consecutively numbered in the in-line, cross line and time directions. A geologic time change, also referred to herein as a "difference value", may be calculated from a geologic time volume. These difference values may be calculated by taking the difference in geologic time of data sample points (which may also be referred to as data locations) in the geologic time volume. For example, this difference could be taken along either the in-line, the cross line, or the time direction. These differences could be calculated as either a forward difference, a backward difference or a gapped difference. By forward difference is meant the difference between a first data sample point and the next higher numbered data sample point. By backward difference is meant the difference between a first data sample point and the next lowest numbered data sample point. By gapped difference is meant the difference between data sample points which are not adjacent (for example, for a particular data location, gapped difference may be the difference between the geologic time of a lower numbered data sample point and a higher numbered data sample point than the particular data sample point). Whether to use forward difference, backward difference or a gapped difference for the calculations for a particular geologic time volume is subject to the judgment of the interpreter or analyst. The difference values could also be calculated at any angle to an in-line or cross line direction, or the time direction. For example, they could be calculated along the diagonal between the in-line and cross line axes by either incrementing or decrementing both in-line and cross line sample locations, or by incrementing either the in-line or cross line sample location, and decrementing the other. In addition, the difference could be a combination of any of the calculated differences.

Geologic time changes calculated in the in-line direction may be referred to herein as the "$\Delta$inline" difference values. Geologic time changes calculated in the cross line direction may referred to herein as the "$\Delta$crossline" difference values, and geologic time changes in the time direction may be referred to as the "$\Delta$time" difference values.

The sign (positive or negative) of the resulting difference value will depend upon the convention used in the calculation (that is, whether a negative or positive number is used to indicate a decrease in geologic time) and the geology. In general it is preferable that a positive difference should indicate an increase in geologic time (a change from a younger to an older geologic time) between the two samples while a negative number will indicate a decrease in geologic time (a change from an older to a younger geologic time).

Other difference values may be calculated from $\Delta$inline, $\Delta$crossline and $\Delta$time difference values. Difference volumes may then be generated for any or all of the $\Delta$inline, $\Delta$crossline and $\Delta$time difference values as well as for any of the other calculated difference values.

Further, the $\Delta$inline, $\Delta$crossline and $\Delta$time difference values may be deemed to be the difference values along three orthogonal axes through the data volume. Similar results may be obtained regardless of whether the data volume is rotated through an angle, or the axes from which the differences are calculate are rotated through an angle within the volume. For example, the $\Delta$inline and $\Delta$crossline values could be generated along the diagonals of the in-line and cross line axes, rather than along the in-line and cross line axes. Therefore, it is understood that the $\Delta$inline, $\Delta$crossline and $\Delta$time difference values referred to herein may be generated following the rotation of either the data volume or the axes along which these values are calculated.

The $\Delta$inline, $\Delta$crossline and $\Delta$time difference values can be thought of as defining points in a rectangular coordinate system. Therefore, these points can be converted to (or generated in) other coordinate systems, such as polar or cylindrical, thus generating other difference values. Six of the more useful difference values which may be calculated from the $\Delta$inline, $\Delta$crossline and $\Delta$time difference values are as follows:

Total difference magnitude=$(\Delta time^2+\Delta inline^2+\Delta crossline^2)^{1/2}$ (Eq. 1)

Spatial difference magnitude=$(\Delta inline^2+\Delta crossline^2)^{1/2}$ (Eq. 2)

In-line temporal difference magnitude=$(\Delta time^2+\Delta inline^2)^{1/2}$ (Eq. 3)

Cross line temporal difference magnitude=$(\Delta time^2+\Delta crossline^2)^{1/2}$ (Eq. 4)

Azimuth of the total difference magnitude = inverse tangent of $\dfrac{\Delta crossline}{\Delta inline}$ (Eq. 5)

Inclination (dip) of the total difference magnitude=inverse cosine of $\Delta$time/total difference magnitude (Eq. 6)

The spatial difference magnitude represents the difference value in the horizontal plane. In-line temporal difference magnitude represents the difference value within a vertical plane extending in the in-line direction (Eq. 3), and cross line temporal difference represents the difference value within a vertical plane extending in the cross line direction (Eq. 4).

Another manner in which the difference values can be represented is as vectors, the cross product of which will approximate a surface normal of a plane of constant geologic time. For instance, for $\Delta$inline and $\Delta$crossline values, the vectors might be in the form of in-line, cross line and geologic time difference. The $\Delta$inline difference value could be represented as (0, xL, $\Delta$inline), where the first value is zero since both points are on the same in-line, xL is the number of traces (or distance) between the two points used to generate the $\Delta$inline values, and $\Delta$inline is a representative of the in-line vertical displacement. Similarly, the $\Delta$crossline difference value could be represented as (iL, 0, $\Delta$crossline), where iL is the number of traces (or distance) between the two points used to generate the $\Delta$crossline value, the middle value is zero since both points are on the same cross line, and $\Delta$crossline is a representation of the cross line vertical displacement. Similar vectors could be constructed for other difference values.

If a geologic time volume is contaminated with random noise, it may be advantageous to perform some type of signal enhancement techniques to improve the detectablity of anomalous discontinuity locations. Such signal enhancement techniques are well known to those of ordinary skill in the art and include, but are not limited to, averaging the calculated differences over several data sample points, performing some type of least squares estimate (or other data fitting measure) based on the calculated values, or taking the maximum value found within a several data sample point region. Such signal enhancement techniques could be applied to the input geologic time values, or the calculated difference values.

Figure 4A:
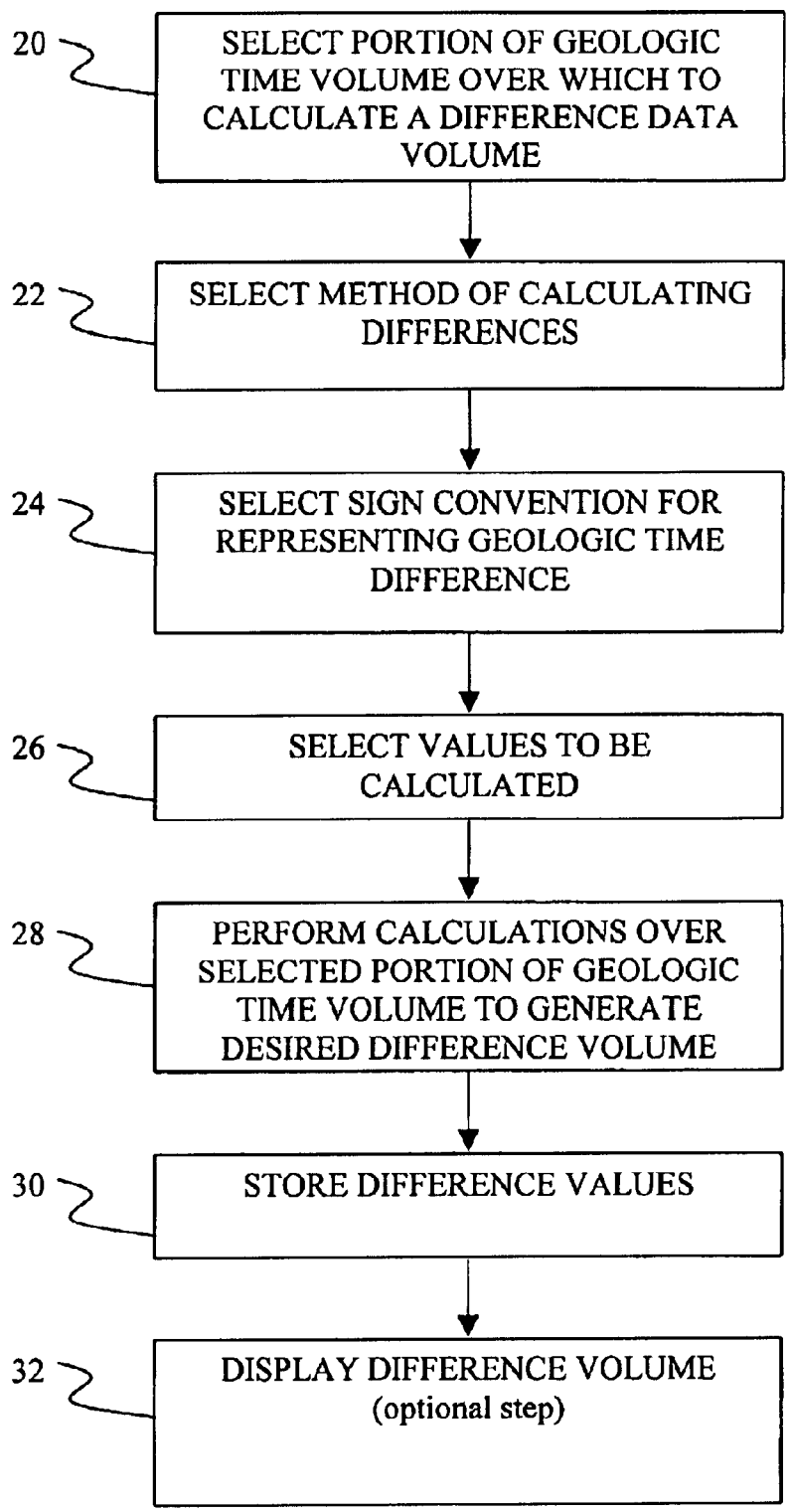
FIG. 4A is a flow diagram showing a process that may be performed to generate a difference volume.

FIG. 4A is a flow diagram illustrating the process that may be performed to generate a difference volume. First, in step 20, the portion of the geologic time volume over which the difference values are to be calculated is selected. The selected portion may include the entire volume, or a smaller region of interest. Next, in step 22, the method of calculating the differences is selected. For example, the forward difference method previously discussed might be selected. In step 24 a sign convention for representing the differences is selected. As stated previously it is normally desired for an increase in geologic time to be represented as a positive number. In step 26 one or more values that are to be calculated are selected. These values may include, but are not limited to the Δinline, Δcrossline and Δtime difference values, the total difference magnitude (Eq. 1), spatial difference magnitude (Eq. 2), in-line temporal difference magnitude (Eq. 3), cross line temporal difference magnitude (Eq. 4), azimuth of the total difference magnitude (Eq. 5) and dip of the total difference magnitude (Eq. 6). It is understood that steps 20, 22, 24, and 26 can be performed in any order. In step 28, the choices made in steps 20, 22, 24, and 26 are used to calculate the selected difference values over the selected portion of the geologic time volume to generate the selected difference volume or volumes.

In step 30, the difference values calculated in step 28 are stored in a data storage medium to generate one or more difference volumes.

The resulting difference volumes can be displayed, in step 32, in any method normally used to display seismic data (or seismic data attribute) volumes. In particular, volume visualization is a good way to display the resulting data volumes. With volume visualization techniques, an opacity function can be used to show locations of anomalous difference values. For example, the VoxelGeo program marketed by Paradigm Geophysical, referred to previously, may be used to make most of the data points transparent, while leaving the largest amplitude differences opaque.

It is understood that the difference values may be calculated from a derived volume which has been derived from a geologic time volume, such as dip magnitude, dip azimuth or isopach volume, as well as directly from the geologic time volume.

The difference volumes described herein are useful for providing indications of discontinuity locations. However, being able to identify the anomalous difference locations, particularly those anomalous locations that are spatially connected, will provide improved information regarding the discontinuities.

Discontinuity Volumes

A discontinuity location is indicated by an anomalous change in geologic time between two data sample points. The term "discontinuity value" as used herein will generally refer to an anomalous difference value, and will typically be generated by subtracting an average difference value from a difference value as further described herein. (Note: a discontinuity location might also be indicated by an anomalous change in other seismic data attributes.) Typically the data sample points over which the geologic time change is measured are adjacent; either vertically, horizontally, or diagonally. But this is not always the case as further described herein. An "anomalous" change in geologic time is normally thought of as a "large" change in geologic time. Typically, "large" might be a value that is more than one standard deviation above the local mean of the calculated geologic time changes. A change in polarity might also be considered anomalous. Whether or not a time change is "anomalous" may be subjectively determined based on the data in a particular volume and the manner in which the geologic time changes are calculated. For example, in areas of moderate dip a small reverse fault could juxtapose beds of similar age, thus producing a small geologic time difference in a region that typically has higher geologic time differences. In this case, a small geologic time difference would indicate a discontinuity. Therefore, in one implementation of the invention, geologic time changes are calculated, and these changes are then studied (or further processed) to identify the anomalous locations. For example, a measure could be obtained of how a particular difference value deviates from an average difference value.

The primary causes of discontinuities in seismic data, and therefore in a geologic time volume, are unconformities, faults, fluid contacts, source generated noise (such as multiples, sideswipe, and converted waves), and noise from unknown causes. Discontinuity volumes may be generated which depict all discontinuities, however caused. However, as further described herein, discontinuity volumes may also be generated which display specific types of discontinuities, such as faults, unconformities or discontinuities from unknown (or unassigned) causes. Note that locations identified by discontinuities from unknown causes might indicate locations where there are problems in the geologic time volume. If this is the case, typically locations close to these discontinuities will have geologic time values that do not directly correspond to the geologic time at which the sediments corresponding to the data sample points were deposited. Such locations identified by discontinuities from unknown causes may indicate potential interpretation errors, or geologic time volume generation errors.

Figure 4B:
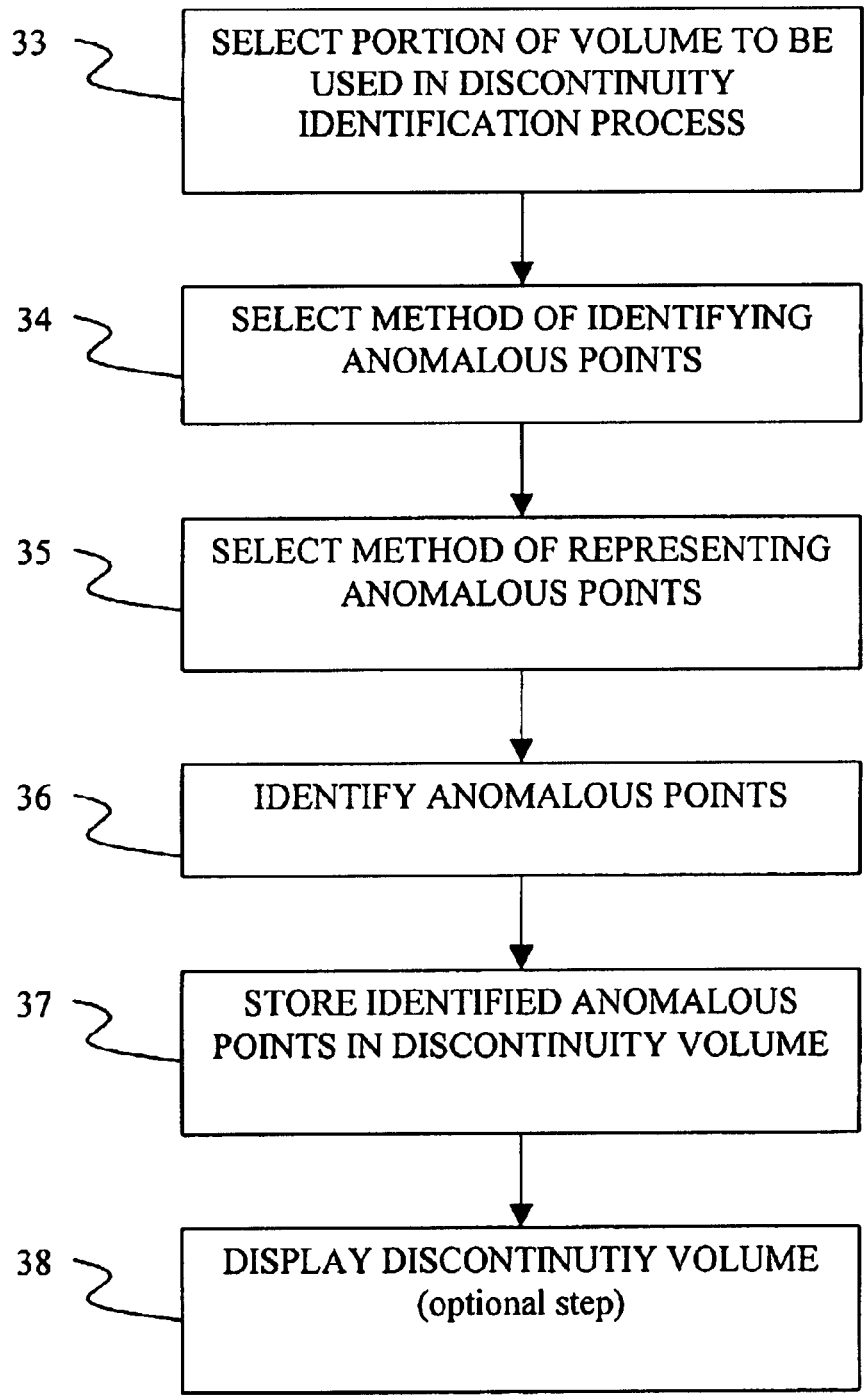
FIG. 4B is a flow diagram showing a process that may be performed to generate a discontinuity volume.

FIG. 4B is a flow diagram illustrating the process that may be performed to generate a discontinuity volume. In step 33, the portion of the volume (or volumes) to be used in the discontinuity identification process is selected. This selection process includes selecting which type of volume to use. A geologic time volume (or a portion of such volume) may be selected, and various derived volumes may be generated from the geologic time volume, and then be utilized to generate a discontinuity volume. A derived data volume previously derived from a geologic time volume may also be selected for generating the discontinuity volume. Any of the difference volumes just described can be used in the process for generating a discontinuity volume. Any of the other derived volumes further described herein may also be used, such as a dip magnitude, dip azimuth or isopach volume, but might not produce results as good as the results from use of the difference volumes.

In step 34, a method of identifying the anomalous points is selected. The term "anomaly" and "anomalous" are used extensively in the geophysical literature. Sheriff's geophysical dictionary "Encyclopedic Dictionary of Exploration Geophysics, $2^{nd}$ Edition", compiled by R. E. Sheriff, 1984, Society of Exploration geophysicists includes seven definitions, of which the first two are most applicable:

1. a deviation from uniformity in physical properties, a perturbation from a normal, uniform or predictable field, and
2. Observed minus theoretical value.

In addition, as used herein, an anomalous value also includes any value that is a perturbation from a normal, a uniform, or a predictable value based on its neighboring values (neighboring values may include anything from one point close to the value to all points in the volume). A predictable value includes, but is not limited to: a global average, a local average, a weighted average, a median value, a mode value, or a curve, surface, or volume fit to the neighboring values. An anomalous value can also mean a value that has a different appearance from the values that generally surround it. Any of these methods may be used find the anomaly or several of them may be used, and the anomalies detected by each method may be combined to generate a final output anomaly value. Perturbations based on a local average of the data volume is a simple method to implement that may detect most of the anomalous values. In the selection process, a threshold might be used to select only the larger perturbations. For example, only those perturbations that are one standard deviation or more away from the predicted value might be declared anomalous. The selection process might also include the identification of local maximums, local minimums, or those locations where the local difference values are more than some magnitude away from a local average value. This particular magnitude might be user selected, or it might be derived from the data (a standard deviation for example).

The selection criteria may also include connectivity tests. For example, it may be decided to only retain anomalous points that are connected to at least ten (or some other number of) other anomalous points.

In step 35, a method of representing the anomalous points is selected. Again, there are several ways in which the anomalous points might be represented. In general there will be a representation that identifies a point as not being anomalous, and another representation that identifies a point as anomalous. One way of doing this is to represent the anomalous points with a single bit, which, for example, is "off" if the point is not considered anomalous or "on" if it is considered anomalous. The anomalous points might also be represented by a value that is a measure of the magnitude of the perturbation from a predictable value. The number of other anomalous points that an anomalous point is connected to is yet another way in which an anomaly might be represented.

In step 36, the portion of the volume selected in step 33 is searched to identify the anomalous points. These identified anomalous points are then stored, in step 37, in a discontinuity volume in the manner selected in step 35. If more than one method of representing the anomalous points is selected, then several discontinuity volumes may be generated. In step 38, the discontinuity volume or volumes can optionally be displayed. A volume visualization program, such as VoxelGeo is useful for displaying and studying such volumes to understand the geologic meaning of the detected discontinuity locations. Opacity filtering will be particularly useful to display just the locations that have been selected as discontinuities. Such volume visualization programs generally contain voxel tracking procedures that can be used to identify regions of connected discontinuities.

It may also be useful to generate discontinuity volumes which display specific types of discontinuities. Once a discontinuity has been identified in a discontinuity volume, attributes of the discontinuity (including but not limited to magnitude of deviation from mean) and the extent of the discontinuity may be used to estimate the cause of the discontinuity. Discontinuities that are spatially continuous and predominantly horizontal are generally classified as unconformities. Discontinuities which are spatially continuous and substantially vertical are typically faults. Discontinuities which are predominantly horizontal and have a limited spatial extent may be indicative of a contact zone between different fluids (e.g., a gas-water, oil-water, or gas-oil contact surface). Some faults and unconformities will be apparent by inspection of opacity filtered discontinuity volumes because the faults and unconformities will show up as highly anomalous discontinuity values that are spatially continuous. Because of their limited spatial extent, fluid contact locations may be more difficult to identify than faults and unconformities, but may also be discernable.

Anomalies identified from the different input volumes, and from the various difference calculations, may also be combined to form another volume of discontinuity locations.

Fault Volume

Figure 5:
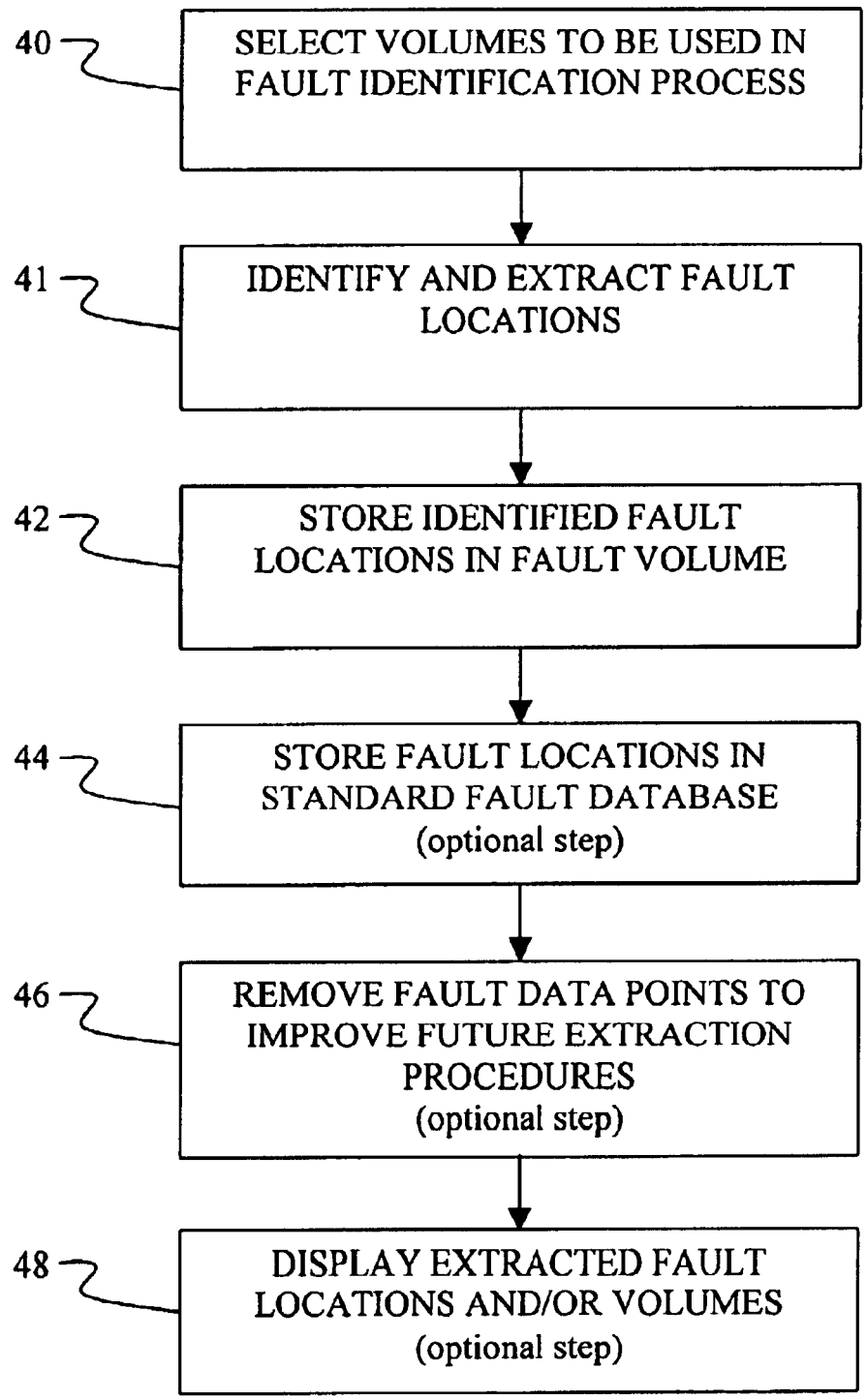
FIG. 5 is a flow diagram which outlines a process for generating a fault volume

FIG. 5 outlines the process for generating a fault volume from a derived data volume. Normally the volume to be used will be a discontinuity volume, such as one of those described above, or other volumes, such as those described below (e.g., the dip magnitude and dip azimuth volumes, or the isopach volume). In step 40, the volume or volumes to be used in the fault identification process is selected. As part of the selection process, a portion of a volume may be selected (such as in the manner described above) instead of an entire derived volume. In step 41 the selected volume is analyzed for the presence of faults, and the fault locations are identified and extracted. Connected areas of anomalous spatial difference magnitude within the volume should be indicative of faults.

Of the volumes that might be selected in step 40, the discontinuity volume derived from the spatial difference magnitude volume (calculated with Eq. 2) is one of the more useful discontinuity volumes for detecting faults, although other discontinuity volumes may be utilized. A spatial difference magnitude volume may also be utilized in conjunction with a dip magnitude volume, as described hereinafter, for identifying fault locations. Locations having both an anomalous spatial difference magnitude in the spatial difference magnitude volume and an anomalous value of inclination in the dip magnitude volume should be indicative of faults. Yet another method for identifying fault locations utilizes a spatial difference magnitude volume, a dip magnitude volume and a dip azimuth volume. The inclination, the azimuth, and the magnitude of geologic time change of identified fault points can be used to determine if there are a plurality of faults. Further, the azimuth, and the dip and difference magnitudes of an identified fault point can be used to determine which fault plane the identified fault point is on, since on any given fault plane, each of these values should vary slowly, but there should be significant variations in the combination of these values between different fault planes.

An isopach volume (described further herein) may also be used to assist in identifying fault locations. Abrupt lateral changes in the isopach values, particularly those that have linear trends in map view, can indicate the locations of faults. This is particularly true in areas of growth faulting, where the beds are generally thicker on the down thrown side of the faults. The abrupt lateral changes can be detected by using the isopach volume (in place of the geologic time volume) as input to the difference volume calculation, (particularly the spatial difference calculation), followed by the discontinuity volume calculation.

Fault identification processes (step 41 of FIG. 5), also referred to as the fault extraction processes, include but are not limited to the following methods. One method relies on visual identification of the faults by using data visualization techniques such as different color maps, or volume visualization with opacity filtering. In this method, unique colors or opacity values are assigned to the anomalous values. For example, data points having anomalous values could be assigned a red color, and other data points could be assigned a blue color. With regards to opacity, data points having an anomalous value could be assigned an opaque opacity value, and other data points could be assigned a transparent opacity value. A second method utilizes user interaction techniques to identify the actual fault points in addition to visual identification techniques. These user interaction techniques may include manually digitizing anomalous points to distinguish between points that are geologically significant and those that are not, using polygons or polyhedrons to isolate anomalous opacity regions, and seed or voxel tracking techniques. A third method comprises numerical filtering, of which the opacity filtering could be considered one example, to isolate or distinguish the fault data points from the non-fault data points. This third method may include dip filtering, combining different attribute values and joint amplitude threshold or filtering. Some type of automated fault extraction technique, such as voxel tracking or other discontinuity tracking can then be applied to these enhanced data volumes to extract the actual fault locations.

In step 42 the identified fault locations are then utilized in generating a fault volume. In the fault volume, data points will represent some aspect of a fault. The aspect represented could be, for example, the existence or nonexistence of the fault at a particular location, or some other value representing the fault, such as the geologic time difference across the fault, or other anomalous value used to identify the fault. The size of the anomaly can be used as a measure of as how "good" the fault pick is. The larger the anomaly, the better the fault pick. In the case where the fault locations are visually identified, a color map, opacity function, or both are used to create a volume in the computer display memory that emphasizes the data locations that represent faults and de-emphasizes the non-fault locations. Normally these created volumes remain in the computer memory or display hardware. Although they can be saved to a permanent storage medium, they are normally recreated when needed, by storing the color table and opacity functions used to generate the display. Such storage is viewed to be in the scope of step 42 of FIG. 5. A color map, opacity function, or both may also be used to provide a means of locating the "good" fault locations. For a color map, this may be accomplished, for example, by using a color scale that grades from white to blue. The lowest anomaly values are assigned the white colors and the highest anomaly values are assigned the blue colors, with the values between these endpoints being assigned a proportional color. If an opacity function is utilized, opacity can be used as a measure of how "good" the fault is. This is accomplished, for example, by using an opacity scale that grades from completely transparent to completely opaque. The lowest anomaly values are assigned the completely transparent values and the highest anomaly values are assigned the completely opaque values, with the values between these endpoints being assigned a proportional opacity. In such a display the opacity can be used as a measure of how "good" the fault is.

Optionally, in step 44, the locations included in the fault may also be represented in a typical interpretation data base, in the form of data points, line segments, poly-lines or triangulated surfaces. These representations may be derived directly from the identified and extracted fault locations of step 41 or from the extracted fault volumes of step 42.

Step 46 is another optional step that can be performed. Once a particular data point is determined to be part of a fault, it can be removed from the volumes being used for differentiating between the different discontinuity types. A data point removed may be replaced with the average discontinuity value, or a special fault value, and identified so that it has a minimal affect on other calculations or discontinuity differentiation processes.

The resulting fault volume or extracted locations can be displayed, in step 48, in any method normally used to display seismic data or seismic data attribute volumes, or fault locations obtained from conventional methods. In particular, volume visualization is a good way to display the derived resulting data volumes. With volume visualization techniques, an opacity function can be used to show just those locations associated with faults, and also the quality of the fault locations if they have been represented in that way.

Unconformity Volumes

Figure 6:
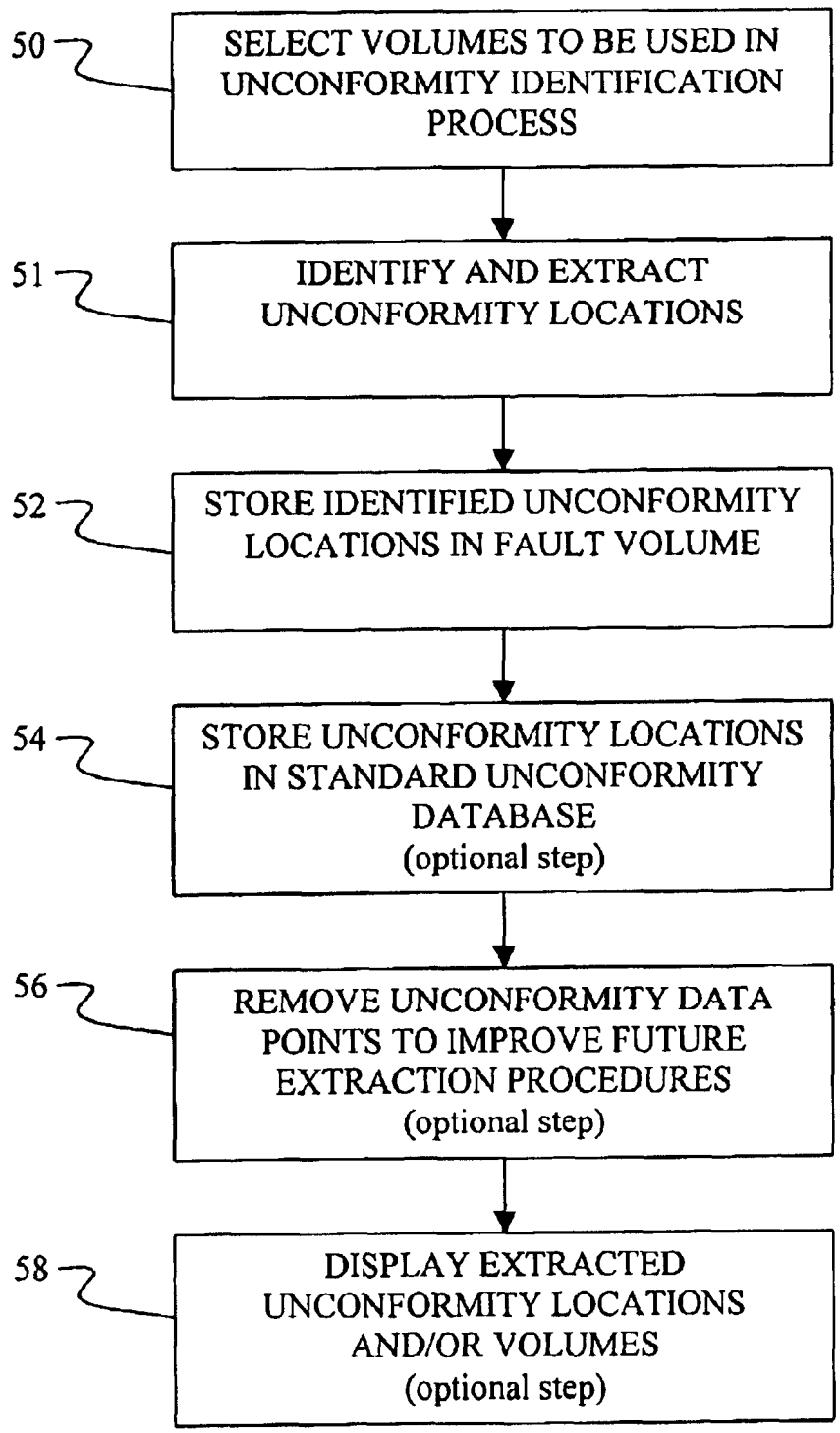
FIG. 6 is a flow diagram which outlines the process for generating an unconformity volume.

In another implementation of the invention, unconformity volumes are generated. The methods for generating unconformity volumes are very similar to those used to find the faults, except that unconformities are substantially horizontal. If fault locations are identified and removed from the data used to find the unconformities (or vise versa depending on which are found first), the process may be potentially speeded up. With reference to FIG. 6, in step 50, a volume or volumes are selected to be used in the unconformity identification process. These volumes are analyzed, in step 51, for the presence of unconformities. In searching for unconformities the discontinuity volume derived from the time difference volume ($\Delta$time volume), which includes geologic time changes in the time direction, may be the most useful, since unconformities will appear as approximately horizontal, spatially continuous discontinuities. A time difference volume ($\Delta$time volume) generated from an isopach volume, instead of directly from a geologic time volume, as input for the calculation of a discontinuity volume might also be useful for locating the unconformities.

The unconformity extraction processes, step 51, may be substantially similar to the fault extraction processes described above with reference to step 41. Unconformity extraction processes include but are not limited to the following methods. One method relies on visual identification of the unconformities by using data visualization techniques such as different color maps, or volume visualization with opacity filtering. A second method utilizes user interaction techniques to identify the unconformity points in addition to visual identification techniques. These user interaction techniques may include manually digitizing anomalous points to distinguish between points that are geologically significant and those that are not, using polygons or polyhedrons to isolate anomalous opacity regions, and seed or voxel tracking techniques. A third method comprises numerical filtering, of which the opacity filtering could be considered one example, to isolate or distinguish the unconformity data points from the non-unconformity data points. This third method may include dip filtering, combining different attribute values and joint amplitude threshold or filtering. Some type of automated unconformity extraction technique, such as voxel tracking or other discontinuity tracking can then be applied to these enhanced data volumes to extract the actual unconformity locations.

An unconformity volume is created in step 52 in which data points in the unconformity volume represent some aspect of the unconformity. The aspect represented could be, for example, the existence or nonexistence of the unconformity at a particular location, the amount of geologic time missing across the unconformity, or some other value representing the unconformity. The size of the anomaly value, the number of other anomalous points the anomaly is connected to, or any combination of these measurements can be used as a measure of how "good" the unconformity pick is. In the case where the unconformity locations are visually identified, a color map, opacity function, or both are used to create a volume in the computer display memory that emphasizes the data locations that represent unconformities and de-emphasizes the non-unconformities locations. Normally these created volumes remain in the computer memory or display hardware. Although they can be saved to a permanent storage medium, they are normally recreated when needed, by storing the color table and opacity functions used to generate the display. Such storage is viewed to be in the scope of step 52 of FIG. 6. A color map, opacity function, or both may also be used to provide a means of locating the "good" unconformity locations. For a color map, this is accomplished, for example, by using a color scale that grades from white to blue. The lowest anomaly values are assigned the white colors and the highest anomaly values are assigned the blue colors, with the values between these endpoints being assigned a proportional color. If an opacity function is utilized, the opacity can be used as a measure of how "good" the unconformity is. This is accomplished, for example, by using an opacity scale that grades from completely transparent to completely opaque. The lowest anomaly values are assigned the completely transparent values and the highest anomaly values are assigned the completely opaque values, with the values between these endpoints being assigned a proportional opacity. In such a display the opacity can be used as a measure of how "good" the unconformity is.

Optionally, in step 54, the locations included in the unconformity may also be represented in a typical interpretation data base, in the form of data points, line segments, poly-lines or triangulated surfaces. These representations may be derived directly from the identified and extracted unconformity locations of step 51 or from the extracted unconformity volumes of step 52.

Step 56 is another optional step that can be performed. Once a particular data point is determined to be part of an unconformity, it can be removed from the volumes being used for differentiating between the different discontinuity types. A data point removed may be replaced with the average discontinuity value, or a special unconformity value, and identified so that it has a minimal affect on other calculations or discontinuity differentiation processes.

The resulting unconformity volume or extracted locations can be displayed, in step 58, in any method normally used to display seismic data, seismic data attribute volumes, or unconformity locations obtained from conventional methods. In particular, volume visualization is a good way to display the resulting derived data volumes. With volume visualization techniques, an opacity function can be used to show just those locations associated with unconformity, and also the quality of the unconformity locations if they have been represented in that way.

An unconformity volume may also include fluid contact surfaces. The dips of horizons above and below a discontinuity provide a further indication as to whether a particular discontinuity represents an unconformity or a fluid contact location. If the horizons above and below the discontinuity are substantially continuous across the discontinuity (almost as if the discontinuity was not there), the discontinuity is typically a fluid contact location. If the horizons above and below the discontinuity exhibit substantially different strike and/or dip across the discontinuity, the discontinuity is typically an unconformity. A fluid contact will be substantially flat in depth (or time). A fluid contact surface is an indication of an accumulation of hydrocarbons and therefore the ability to identify them is very valuable.

Discontinuities which are left over after the faults and unconformities have been identified may be referred to as "Unassigned discontinuities". One purpose in generating an unassigned discontinuity volume is that upon studying such volumes, it may be possible to identify the cause of discontinuities in these volumes. Some of these discontinuities may be fluid contact locations, although some fluid contact locations may be contained in the unconformity volumes. They may also contain fault and unconformity segments that were not properly assigned. However, in general an unassigned discontinuity volume will contain source generated noise, such as multiple, sideswipe and/or converted wave energy, as well as random noise. Typically, source generated noise looks like a local unconformity but the unconformity surface itself is discontinuous, and probably does not make geologic sense.

Discontinuities which are random or isolated are generally the result of noise or data contamination. It may be possible to identify areas in the volume that are contaminated with source generated noise (i.e., multiples, sideswipe or converted waves). Source generated noise will be evident by areas of non-geologic discontinuity surfaces; that is, zones of discontinuity segments which are locally spatially continuous, but these segments don't connect in a geologically meaningful way. Source generated noise might look like a local unconformity, but this unconformity surface itself is discontinuous and non-geologic. Areas of the volume which contain such discontinuity segments have a higher probability of containing incorrect structural and stratigraphic interpretations, and therefore any proposed hydrocarbon traps from such areas should have assigned a higher risk associated with finding economic hydrocarbon reserves.

Throw and Heave Volumes

As used herein, the term "throw" refers to the vertical distance between two points that have substantially the same geologic time and the term "heave" refers to the horizontal distance between two points that have substantially the same geologic time. Likewise, a "throw volume" contains an estimate of the "throw" for several points (sometimes every point) in the volume, while a "heave volume" contains an estimate of the "heave" for several points (sometimes every point) in the volume. When throw and heave are determined across a fault, the values at these locations can take on significantly more geological meaning. Unless the heave and throw values are calculated in the direction of maximum dip, they will represent the apparent heave and throw values. The throw and heave volumes may be calculated from a geologic time volume, either with or without the aid of a calculated fault volume. For a three dimensional volume, the geologic time volume can be utilized to calculate in-line and cross line throw volumes and in-line and cross line heave volumes. Throw magnitude and azimuth can then be calculated from the in-line and cross line throw volumes, while heave magnitude and azimuth can then be calculated from the in-line and cross line heave volumes. The throw and heave volumes can also be combined to generate a total displacement vector, which can also be used to generate total displacement magnitude and azimuth volumes. Alternatively, the in-line throw and heave values can be combined to create an in-line displacement vector and the cross line throw and heave values can be combined to create a cross line displacement vector. The vector cross product of the in-line displacement vector and the cross line displacement vector is the surface normal vector. These calculated surface normal vectors may then be stored in a surface normal vector volume.

The methods describe herein for the calculation of heave and throw volumes are applicable to any direction through the geologic time volume. The discussion will primarily focus on calculating these values along the in-line and cross line directions and combining the resultant values. However, the in-line and cross line directions for calculating the respective heave and throw values are used primarily for convenience. The heave and throw values can be generated for any direction through the geologic time volume, and the angle between any two directions may be used to generate substantially the same results as combining the in-line and cross line values. In areas of noise contamination, a plurality of directions may be used and a plurality of heave and throw values calculated and combined to obtain a best estimate of the maximum heave and throw values at the given location. All directions, averaging, and best estimate methods are assumed to be included in the discussion of the in-line and cross line calculations as described below.

As stated above, the terms throw and heave refer, respectively, to the vertical and horizontal distance between two points that have substantially the same geologic time. With respect to a given location on one side of a fault, throw and heave are each measured to the closest location on the other side of the fault having substantially the same geologic time as the given location. (The data sample point having the closest geologic time to the geologic time of the given location may be accepted as the closest location, unless interpolation between data sample points is utilized in order to determine heave and throw more precisely. Using interpolation to obtain a more precise throw value is generally worth the extra computational effort and programming complexity. However, if the main desired output is the optional geologic time difference volume which will be described below, it is preferable to use the time difference between the sampled points, and not to interpolate.) In an area with strike-slip motion across the fault, the amount of strike movement may not always be ascertainable across the fault, and more interpretation may be required. If strike-slip motion is present, the results of the methods described herein may represent only a portion of the strike motion across a fault.

Figure 7:
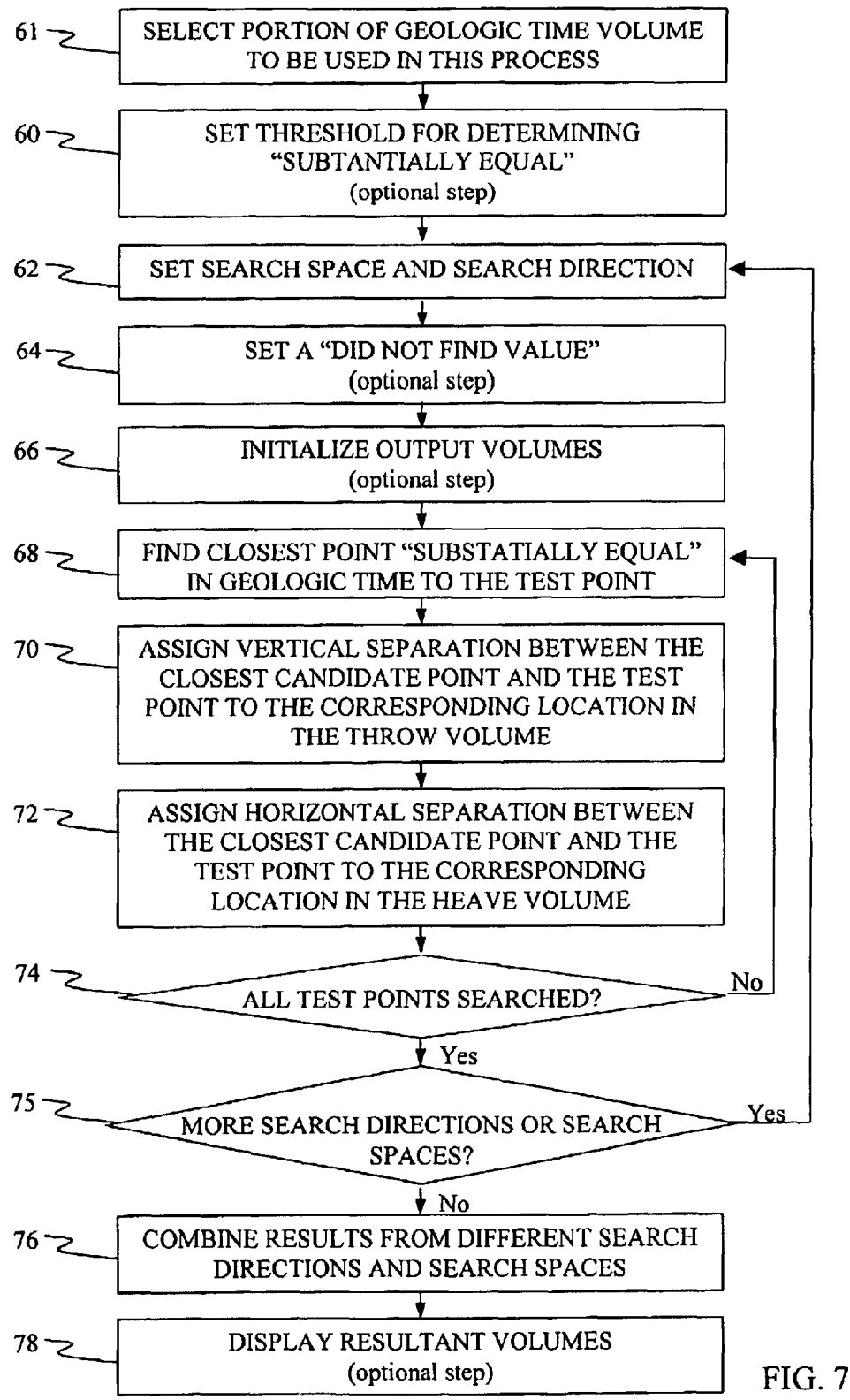
FIG. 7 is a flow diagram which outlines a process for generating heave and throw volumes.

FIG. 7 contains steps that may be utilized to calculate the throw and heave volumes. The term "test point" as used below refers to a location (normally a data sample point) within a geologic time volume with respect to which the amount of throw or heave is to be measured, and the term "candidate point" refers to a location (normally a data sample point) within a search space (within the geologic time volume) for which the throw or heave is measured with respect to the test point. For a particular test point, normally the throw and heave are measured to the same candidate point. As indicated by step 61 in FIG. 7, the following process may be performed for an entire geologic time volume (or a selected portion of the geologic time volume) or it may be performed only for locations that have been determined to be faults.

With reference to FIG. 7, in step 60, a threshold value is set for determining if the geologic time of a candidate point is substantially equal (as further described herein) to the geologic time of the test point. In step 62 a search space and search direction is set. The search direction represents the direction through the volume that the search is to proceed; for example, along the in-line, cross line, or some arbitrary direction. In most cases a search will be performed along both the in-line and the cross line directions. The search space is generally defined relative to the test point and it contains a horizontal search space (or range) and a vertical search space (or range). The in-line and cross line searches will normally use the same relative search space definition. Generally the horizontal search space should have a direction, so that the search will look either forward or backward from the test point, but not both. Generally, the vertical search will include locations above and below the test point. The horizontal search space should be set to a value larger than or equal to the maximum expected heave value, since all heave values must be found within this space. For example, the horizontal search space might consist of 1 to 5 traces in front of (versus behind) the test point and the vertical search space might consist of 7 samples above to 7 samples below the test point. For areas of normal faulting, positive heave values should be used (forward search) while in areas of reverse faulting, negative heave values should be used (backwards search). If the type of faulting is unknown, then both positive and negative values could be used at one time, but in such a case, it may be preferable to create a positive heave volume and a negative heave volume. The vertical search space should be set to a value larger than or equal to the maximum expected throw value, since all throw values must be found within this space. This is normally both a positive and negative range, because in general it is not known a priori if the candidate point will be up-thrown or down-thrown relative to the test point. In step 64, an arbitrary "did not find" value is set. If no candidate point is found in the search space set in step 62 for which the geologic time of the candidate point was substantially equal to the geologic time of the test point, within the set threshold value set in step 60, the did not find value is assigned to that test point. Steps 60, 61, 62 and 64 can be performed in any order. In step 66 output volumes are initialized for storing the throw and heave search results. The initialization value is normally the "did not find" value set in step 64, or a special "did not process" value might be used. If all of the potential test points in the output volume are to be tested (as opposed to just the known fault locations) then this step 66 can be skipped since the process of testing all potential test points will assign a value to all test points.

In step 68 the closest candidate point is found in the search space set in step 62 for which the geologic time is substantially equal to the geologic time of the test point. In the following discussion, "the difference in geologic time" and similar phrases should be understood to be the absolute value of the difference or the magnitude of difference unless otherwise noted. It is desired to find the closest candidate point in an adjacent fault block if such a fault block is present. Several different procedures can be used to determine the best location where the geologic time of the candidate point is "substantially equal to the geologic time" of the test point. The following are three of many methods that might be used. In one method, the difference in the geologic time of the data point above the candidate point and the test point and the difference in the geologic time of the data point below the candidate point and the test point should both be greater than or equal to the difference between the geologic time of the candidate point and the geologic time of the test point. In a second method, assuming the geologic time increases with depth, the geologic time of the data point above the candidate point should be less than the geologic time of the test point and the geologic time of the data point below the candidate point should be greater than the geologic time of the test point. In a third slightly more complicated method, which also assumes the geologic time increases with depth, the test depends upon the sign of the geologic time difference between the test point and the point on candidate point trace, which is located at the same depth as the test point. If the geologic time of the sample point on the candidate point trace at the same depth (travel time) as the test point is less than the geologic time of the test point, then the search proceeds down the candidate point trace, and the best candidate point is the one that has the largest geologic time that is also less than or equal to the geologic time of the test point. If the geologic time on the candidate point trace at the same depth (travel time) as the test point is greater than the geologic time of the test point, then the search proceeds up the candidate point trace, and the best sample is the one that has the smallest geologic time that is also greater than or equal to the geologic time of the test point. In addition to whichever of the above methods is used, the difference between the geologic time of the candidate point and the geologic time of the test point should be less than or equal to the threshold set in step 60. If more than one candidate point meets these criteria, additional tests can be used to identify the closest point. For instance, the candidate point whose physical location is closest to the test point may be selected. If two candidate points meeting these criteria are equally distant from the test point, the candidate point with the smallest geologic time difference from the test point geologic time may be selected. If a closest point is found in step 68, then in step 70, the vertical separation between the closest point found in step 68 and the test point is assigned to the corresponding test point location in the throw volume, and in step 72 the horizontal separation between the two points is assigned to the corresponding location in the heave volume. (It would be equally valid to store the values in one volume, where each location in the volume is represented with two values, one for heave and one for throw. It would also be equally valid to store the locations of the closest point (for example the in-line and cross line values instead of the heave and throw values) at a position corresponding to the test point since the separations could be calculated from this stored data.)

A decision is made in step 74 as to whether steps 68, 70 and 72 have been repeated for all selected test points, and steps 68, 70 and 72 are repeated until a search for the closest point is made for all data points selected in step 61.

As step 75 indicates, if additional search directions or search spaces are to be searched, steps 62, 68, 70, 72 and 74 will be repeated again for all selected search directions and search spaces. (Typically, blocks 64 and 66 will be performed only once during the process outlined in FIG. 7.) It would be equally valid to swap the order of steps 74 and 75 (but making sure the output initialization of step 66 is only performed once) so that all search directions and search spaces are searched for each test point, and then the process repeated for all test points.

The order in which the candidate points are compared to the test points is arbitrary. However, using certain procedures can reduce the number of data sample points that need to be chosen as candidate points and tested, thus reducing the search effort. For example, once a test point and closest candidate point are found, then beginning the search for the closest candidate point for a new test point adjacent to the previous test point could begin from the previously determined closest candidate point. Also, in general, the geologic time values will increase with travel time or depth. (The volume can be easily tested to find the few areas where this is not true.) When it is known that the geologic volume always increases with time (depth), this information can be used to speed the search, because the sign of the geologic time difference between a test point and a candidate point will eliminate from consideration either the data points above or below the current candidate point.

Figure 8A:
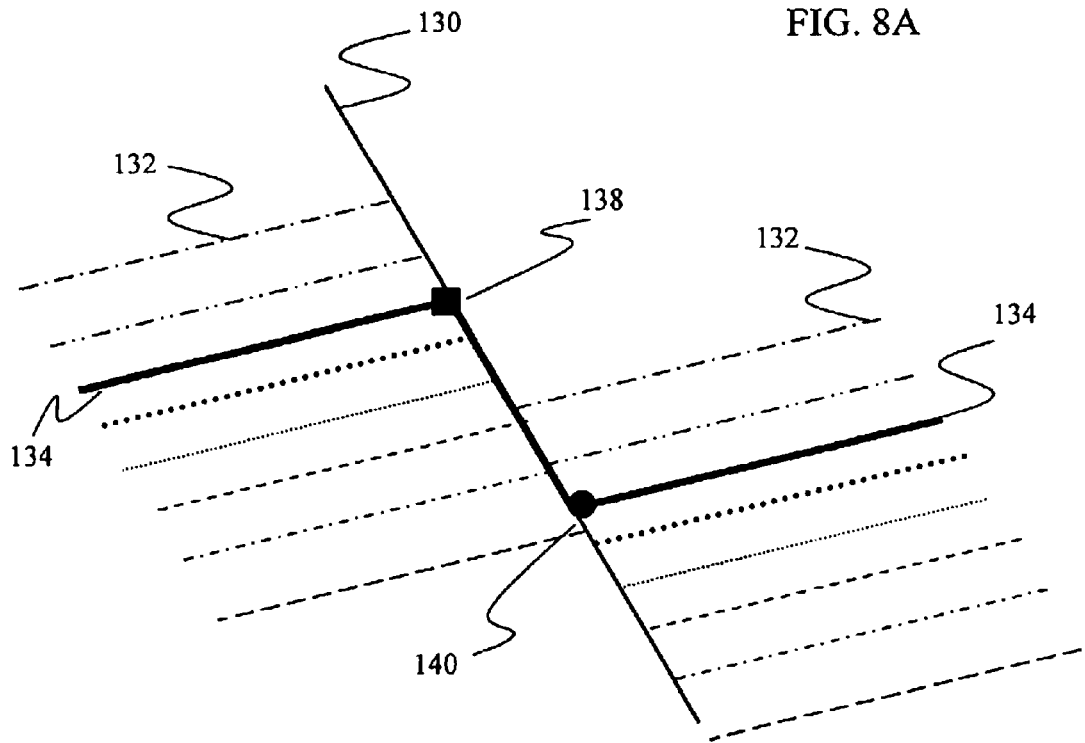
FIGS. 8A and 8B provide an illustration of an application of the invention for generating heave and throw volumes.
Figure 8B:
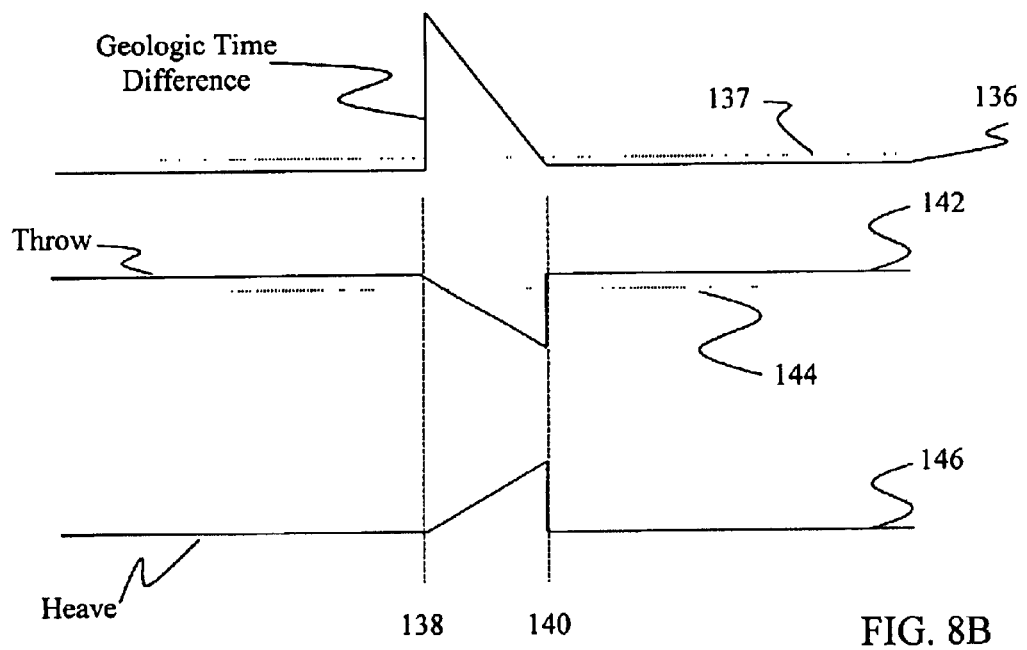

FIGS. 8A and 8B provide an example of some of the results of applying this embodiment to a geologic time volume. In FIG. 8A, the line referenced by numeral 130 represents a fault in the seismic data. The dashed lines including dashed line 132 represent lines of constant geologic time. Reference 134 indicates a particular line of constant geologic time, as well as locations along the fault plane 130 which are closest to this geologic time. Reference numeral 138 represent a test point that falls on this line of constant geologic time just to the left of fault 130, and reference numeral 140 represents the candidate point on the right of fault 130 having a geologic time closest to the geologic time of test point 138.

In FIG. 8B, the curve denoted by reference numeral 136 represents the magnitude of geologic time difference from test points along line 134 to the closest candidate point, while line 137 represents a possible threshold value set in step 60 of FIG. 7. Curve 142 represents the throw along line 134 (line 144 represents zero throw) and curve 146 represent heave along line 134. The geologic time difference, heave and throw values are constant from the left end of line 134 to reference numeral 138 and from reference numeral 140 to the right end of line 134. However, these values vary between reference numerals 138 and 140. The data represented in FIG. 8B between reference numerals 138 and 140 are obtained in a slightly different manner than the rest of this figure as described further below.

Curves 136, 142 and 146 between the left end of the line and the location of reference numeral 138, and between the location of reference numeral 140 and the right end of the line, were measured as follows. The selected test point progresses from left to right along line 134. The candidate point that is closest in geologic time to the selected test point on line 134 always falls on line 134 on the adjacent trace to the right of the test point. Therefore, the geologic time difference between the test point and closest candidate point is always zero, since the geologic time along these portions of line 134 is constant. The very small throw value represents the dip between adjacent data trace locations. The heave value for these portions of line 134 represents the trace spacing.

Between points 138 and 140, curves 136, 142 and 146 represent the geologic time difference, heave and throw values measured from the test point 138 to the "best" candidate point as the heave value is incremented. As the heave value with respect to point 138 is increased, the "best" candidate point will fall on line 134, which is along the fault plane, between points 138 and 140. Note that the magnitude of both the heave and throw increases until point 140 is reached, while the geologic time difference decreases. Point 140 represents the closest point to point 138 in which the difference between the geologic time of a candidate point and the test point (point 138) is less than the threshold value. The throw and heave values for candidate point 140 are what will be placed in the heave and throw volumes at locations corresponding to the point denoted by numeral 138.

This procedure is normally carried out independently in the in-line direction and the cross line direction to obtain in-line heave, in-line throw, cross line heave, and cross line throw volumes. However, the search space can be set to include both an in-line heave range and a cross line heave range, thus creating a search space volume. The results of this modification will be to generate three volumes, (or one volume which contains a 3D vector at each point) which will contain the throw, in-line heave, and cross line heave values.

The foregoing procedure may also be carried out in any direction through the data volume, not just along the in-line and cross line directions. For example, it could be carried out along the diagonals (i.e., at 45 degree angles) between the in-line and cross line directions.

If throw and heave values are calculated from two or more directions through the geologic time volume, these values can be used to generate a surface normal. It is well known that any two vectors that share a common point define a plane that passes through the three points that make up the two vectors. Taking the cross product of these two vectors produces a surface normal of the plane that passes through the points. Such surface normals are very useful in visualization algorithms. (Typically, the length of the surface normal is scaled to equal one, making it a unit surface normal). Each set of throw and heave values defines a vector from the test point to the particular closest candidate point. Therefore, if two different closest candidate points are found, by using two different search spaces for instance, then a surface normal can be calculated. If more than two closest candidate points are found, then each pair of vectors can be used to calculate a surface normal, and then these surface normals can be combined to create an average surface normal. The graphical display of a series of surfaces of constant geologic time can be speeded up by using such a volume of pre-calculated geologic time surface normals.

As stated above, the determination of the closest points can be refined by interpolation instead of just using the location of the candidate data sample point having the closest geologic time to the test point, in which case step 68 (FIG. 7) is modified to provide for interpolation between candidate points to determine a more precise location having substantially the same geologic time as the test point. Interpolation can be performed in either the vertical (travel time) or horizontal (trace spacing) directions, or both.

It may also be useful to calculate the throw volume by finding the location where the absolute value of the difference in geologic time of the candidate location and the test location is a minimum without setting a threshold value limit in step 60. In such case, no threshold value is set in step 60 and no "did not find" value is set in step 64 (i.e., steps 60 and 64 are not utilized). For each test point, there will be an acceptable "closest" candidate point within the search space set in step 62. Note that similar results may be achieved by setting a very high threshold value in step 60 instead of setting no threshold value.

It may also be useful to calculate the throw volume with the horizontal search space in step 62 set to a selected distance, such as either one or two seismic data traces. In this case, it is unnecessary to calculate the heave volume because it will be constant. For this option, the calculated throw values in the throw volume will be proportional to the local dip. There may be many "did not find" values set in this volume if there are faults with heave in excess of the selected distance. The location of the "did not find" values, if spatially continuous, might indicate the presence of a fault or unconformity.

It may also be of interest to combine the above two variations in calculating the throw values (i.e., not utilizing steps 60 and 64 and setting the horizontal search space in step 62 to a selected distance, such as either one or two traces) in order to find the minimum geologic time difference location for a selected test point within the selected search space. Because the horizontal search space is a constant value as set in step 62, the heave value will always be a constant. Therefore, such a calculation will yield a volume that is proportional to dip magnitude. Locations with large or anomalous geologic time differences may indicate fault planes or potential errors in the throw volume calculations.

Further, an optional data volume may be created, in addition to the throw volume and the heave volume, by storing in this optional volume, at locations corresponding to the test point locations, the geologic time difference (which optionally could retain the sign of the difference) between the closest candidate point and the test point. This optional volume will contain "did not find" values at the same locations corresponding to where they are contained in the other volumes generated using this procedure. If the step 60 threshold value is not used (or it is set very high) then anomalies in this optional geologic time difference volume may be good indicators of fault or unconformity locations. Referring back to curve 136 of FIG. 8B, it can be seen that anomalous geologic time difference values are present between locations 138 and 140. The size of the anomaly is greatest just to the right of point 138. Therefore, when a heave value is specified that is less than the actual heave value, and a closest point is found regardless of the geologic time difference magnitude, this optional volume might be useful in detecting fault locations. This optional volume, which contains the geologic time differences between the test points and closest candidate points, may be used to quality control the throw and heave volume results. This optional volume may be particularly useful to generate for the embodiment in which the location for which the absolute value of the difference in geologic time of the candidate location and the test location is a minimum is found without setting a threshold value limit in step 60; and for the embodiment in which the horizontal search space 62 is set to a selected distance; as well as for the embodiment in which the absolute value of the difference in geologic time of the candidate location and the test location is a minimum is found without setting a threshold value limit in step 60 and the horizontal search space 62 is set to a selected distance. Areas that have low geologic time difference values will represent areas with good quality throw and heave values, and therefore good quality dip values, whereas areas with high geologic time difference values will most likely represent areas of faults, unconformities, or noise contaminated regions.

For a three dimensional volume, the steps outlined above for calculating heave and throw values are normally performed in both the in-line and cross line directions to obtain the corresponding in-line and cross line throw and heave volumes. In step 76, these in-line and cross line values can then be combined to obtain throw and heave magnitude volumes as well as azimuth volumes, utilizing relationships well known to those of ordinary skill in the art. In general, step 76 is used to combine the results from the different search volumes, and different search directions, to obtain volumes containing azimuth, throw magnitude, heave magnitude, and surface normal values.

As indicated in step 78, the resultant derived volumes can be viewed in a volume visualization package. For example, if the derived volumes were calculated for an entire geologic time volume (or selected portion of a geologic time volume), then the locations of anomalous throw, anomalous heave, or anomalous geologic time difference may be indicative of faults. These locations can easily be identified using an opacity function that emphasizes the anomalous points relative to the background points.

The throw and heave volumes across faults can be useful in estimating the fault seal qualities with regard to fluid (particularly hydrocarbon) migration.

Dip Magnitude, Dip Azimuth and Strike Volumes

The dip magnitude, dip azimuth and strike volumes can be calculated from the heave and throw volumes generated as described herein. The dip magnitude, dip azimuth and strike values may also be calculated from the difference volumes (for example, the Δinline and Δcrossline difference volumes). However, the dip magnitude, dip azimuth and strike volumes generated from the heave and throw volumes are potentially more accurate since they represent three points in space that are all at substantially the same geologic time (e.g. test point, in-line candidate point, and cross line candidate point).

When calculating dip magnitude, dip azimuth and strike volumes from the heave and throw volumes, it is preferable that heave and throw volumes for an entire geologic time volume (or portion of a geologic time volume) be utilized, rather than just the heave and throw volumes for fault locations. It is also preferable to utilize a volume for which interpolation has been used (at least along the time axis) to find the best candidate point. The in-line heave and throw values of a point represent a vector on a plane that passes through that point. This vector contains the in-line dip. The cross line heave and throw values of the same point represent another vector on the same plane that passes through the point. This vector contains the cross line dip. The in-line and cross line vectors, defining the in-line dip and cross line dip may be combined using standard mathematical techniques known to those of ordinary skill in the art to define the plane passing through the point which defines the subsurface bedding at that point. Dip magnitude and dip azimuth (direction of maximum dip) are two values which can be used to define this plane. Strike (direction of no dip) or the surface normal may also be calculated. In calculating the dip magnitude, the in-line trace spacing and the cross line trace spacing should be used to convert the heave values from number of traces to meters (or feet) if the heave values are measured in number of traces.

Using the throw and heave values, dip magnitude may be calculated in terms of milliseconds per meter by dividing throw by heave (for volumes that are in seismic signal travel time) or meters per meter (for volumes that are in depth). Dip magnitude may also be calculated as dip angle, by using an inverse tangent function, known to those of ordinary skill in the art.

When calculating the dip magnitude, dip azimuth and strike values from the difference volumes (for example, from the $\Delta$inline and $\Delta$crossline volumes), the in-line difference ($\Delta$inline) is used as an estimate of the in-line throw and the cross line difference ($\Delta$crossline) is used as an estimate for the cross line throw. The in-line and cross line heaves are set to the distance over which the differences were calculated.

Calculations utilizing the geologic time difference volumes are normally much faster than calculations using the throw and heave volumes, since the difference values are faster to calculate. Note the dip calculations can be accomplished by using pre-computed difference volumes, or throw and heave volumes, or the calculations can be combined to output the dip volumes directly from the geologic time volume. The two methods (use of throw and heave versus use of difference volumes) will yield qualitatively similar estimates for the dip, although the results may be quantitatively different, and, as stated above, the dip magnitude, dip azimuth and strike volumes generated from the heave and throw volumes may be more accurate, particularly, if the heave and throw volumes were generated using interpolation in at least one direction, preferably the vertical (time or depth) direction.

For either method, values for dip magnitude may be calculated as follows:

$$\text{Dip magnitude} = ((\text{inlinedip})^2 + (\text{crosslinedip})^2)^{1/2}. \qquad \text{Eq. 7}$$

Dip azimuth is calculated as follows:

$$\text{Dip azimuth (direction of maximum dip)} = \arctan (\text{in-line dip/dip magnitude, cross line dip/dip magnitude}), \qquad \text{Eq. 8}$$

and strike is calculated as follows:

$$\text{Strike (direction of no dip)} = \text{dip azimuth} - 90 \text{ degrees}. \qquad \text{Eq. 9}$$

In all of the methods of calculating the dip, a local anomaly in the dip magnitude or dip azimuth may be indicative of a fault, unconformity or fluid contact.

Figure 9:
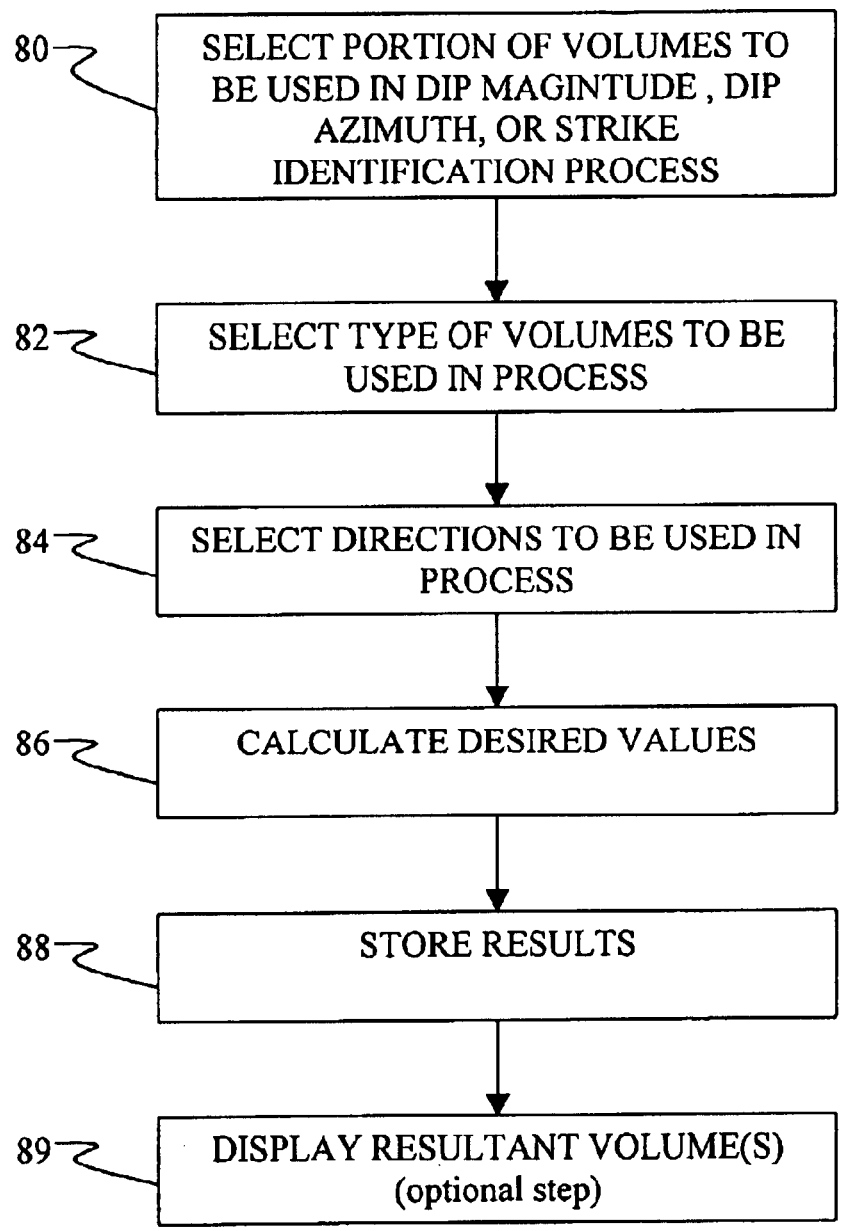
FIG. 9 is a flow diagram which outlines a process for generating a dip volumes.

The foregoing procedure may be generalized as shown in the flowchart of FIG. 9. In step 80 the portion of the volume to be used for the identification of the dip magnitude, dip azimuth, or strike values is selected. Next, in step 82, the type of volumes to be used is selected. As part of this decision, the choice of using pre-computed volumes for the calculation of the dip magnitude, dip azimuth and strike values, or computing these volumes from geologic time volumes as part of this process is decided. For example, one could decide to use pre-computed heave and throw volumes, or one could use a geologic time volume, compute heave and throw volumes and then use these computed heave and throw volumes for the calculation of the dip azimuth, dip azimuth and strike volumes. In step 84, the directions to be used are selected. Normally only two directions will be selected, and they will be the in-line and cross line directions, but it could be any direction through the volume. If pre-computed derived volumes are utilized, this will be the direction in which those volumes were generated. If there is a signal to noise problem, several directions might be selected. The desired values are calculated in step 86 and the results stored in step 88. If more than two directions are chosen, then either a higher order surface (than a plane) can be fit to the points, or some type of averaging, or point fitting (such as a least squares fit) can be employed to obtain the dip magnitude and dip azimuth direction. If a higher order surface is fit to the points, then other local attributes of this surface, such as curvature, could be generated. If some type of point fitting is employed, then some measure of error between the generated surface and the points might also be calculated and saved. The user can calculate just the dip magnitude, or just the dip azimuth if desired, but normally both will be generated. Strike is readily determinable from the dip azimuth. (See Eq. 9, above) The results can then be displayed (in optional step 89). Typically some form of volume visualization will be used to display the resulting volumes.

Closure Volumes

In standard interpretation practices, once a horizon is interpreted, the resulting map is studied to determine if there are any closed contours (commonly called closures) that can trap hydrocarbons. (It is desirable to know if there is a depth closure; however, if the data are still in travel time, and it is not practical or convenient to convert the map or data to depth, the time closure may also be calculated and used.) There are several types of closure that are important. Four-way closure refers to depth (or time) contours that form a closed loop. One example of four-way closure is an anticline, which can be approximated by circular contours that get larger with depth. Each circle represents a closing contour, and the distance between the top of the structure and the deepest circle is the maximum closure. Four-way closure is the most desirable, since it is harder for hydrocarbons to leak out of such a closed structure. Fault closure refers to closing contours that terminate against one or more faults, while stratigraphic closure refers to the bed (and therefore the contours) being terminated due to non-deposition or erosion. There can also be combination closures that result from faulted stratigraphic closures. Fault closures, stratigraphic closures and combination closures are normally not as desirable as four-way closures, since hydrocarbons may leak across the fault, or from a stratigraphic trap, into adjacent strata. However, hydrocarbons are found in all kinds of closures, and therefore, identification of all possible closures in a 3D volume can provide potential locations of hydrocarbon accumulations that might otherwise be missed.

Figure 10:
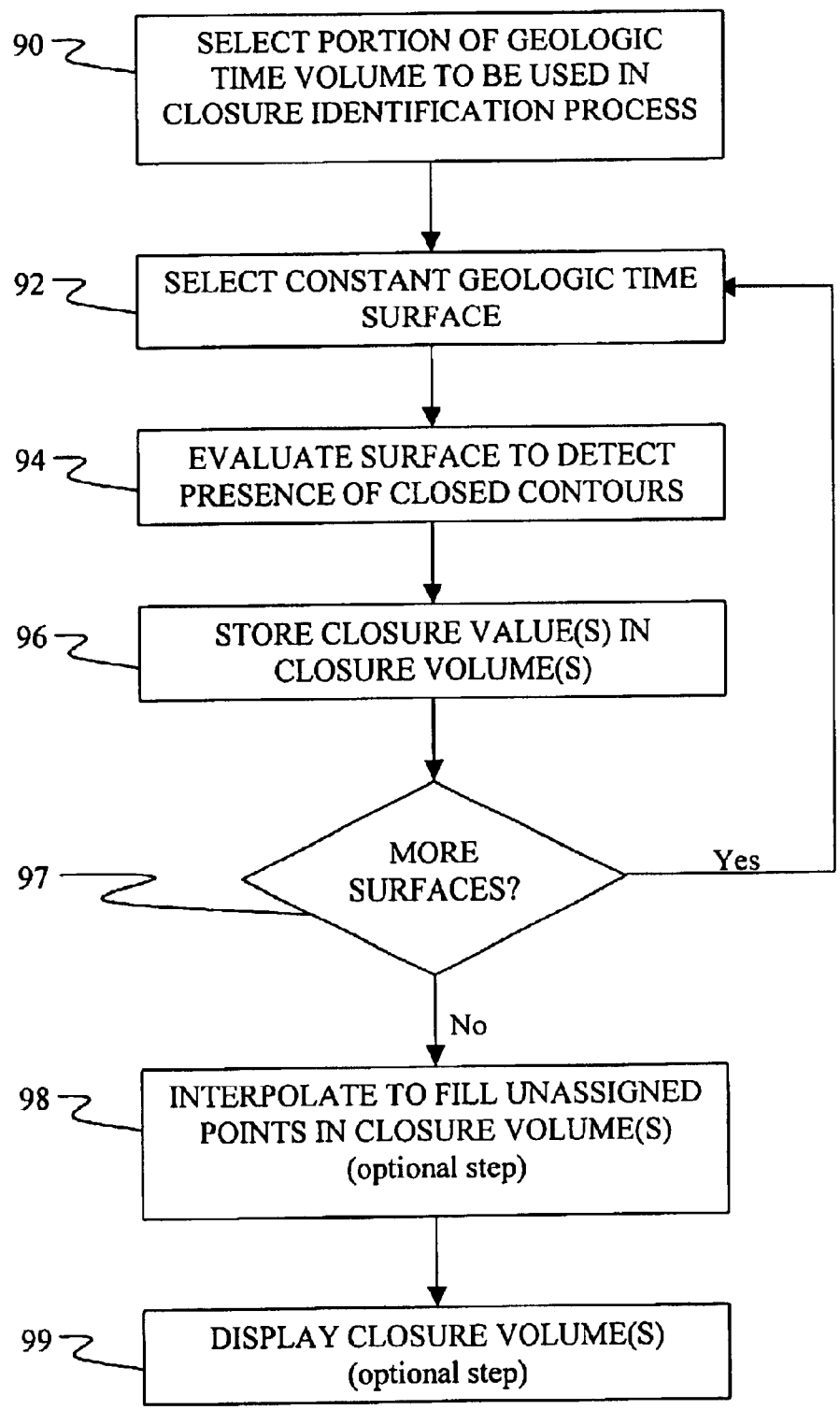
FIG. 10 is a flow diagram which outlines a process for generating a closure volume.

In a geologic time volume, every data sample point in the volume is associated with at least one horizon. With reference to FIG. 10, in step 90, the portion of the geologic time volume for which a closure volume is to be generated is selected. A closure volume may be generated corresponding to an entire geologic time volume, or it may be calculated for only a selected part of the geologic time volume. For example, this selected part of the geologic time volume may be limited in in-line, cross line and time range, or it may be limited to a certain geologic time range, or even specific geologic time values. In step 92 a surface of constant geologic time is selected, and the locations on this surface are found that are within the selected portion of the geologic time volume. There are a variety of ways in which this surface of constant geologic time can be selected. For example, each data sample point in the selected portion of the geologic time volume can be used to select a surface of constant geologic time. (In order to avoid doing extra work, a test may be performed to verify that the output volume does not already contain a closure value for this sample location before proceeding to the next step.) Another method would be to increment the geologic time of the previously selected horizon. Using processes known to those of ordinary skill in the art, the surface of constant geologic time may be evaluated in step 94 to detect the presence of closed contours (closures) and a closure value is assigned to each data location on the surface of constant geologic time. Each closure value is then stored in a closure volume in step 96. If more than one representation of the closure is desired, a different closure volume can be created for each representation, or a single volume, with multiple values per each data location, can be generated. In step 97 a decision is made as to whether there are any more surfaces of constant geologic time to evaluate, or any other data sample locations that need to be assigned a closure value. Steps 92, 94 and 96 are repeated until the question asked in step 97 is false. Optional step 98 is provided for when a complete geologic time volume is not available, but only interpreted horizons that could be used to generate a geologic time volume as further described in U.S. patent application Ser. No. 09/909, 694, having a filing date of Jul. 20, 2001. In such a case, closure values are found on each of the interpreted horizons, and the resultant closure values placed in the appropriate locations in the closure volumes. Since the interpreted horizons will most likely not sample all of the points in the 3D survey, there will most likely be several points in the closure volumes that have not been assigned closure values. These points may be assigned closure values by using interpolation procedures on the surrounding points that do contain closure values. In step 99, the resulting closure volume(s) may optionally be displayed in any method normally used to display seismic data or seismic data attribute volumes. In particular, volume visualization is a good way to display the resulting data volumes. With volume visualization techniques, an opacity function can be used to show regions of closure favorable for hydrocarbon accumulations.

There are a variety of ways in which closure values may be assigned to data sample locations on a surface of constant geologic time (also referred to herein as points). These include, but are not limited to:

Use of one color (or value) to represent points on the constant geologic time surface that are within the closure, and another color (or value) to represent points that are outside of the closure. The value used to represent locations within closures could include but are not limited to the following:
an arbitrarily selected number
a different arbitrarily selected number to represent each of the closures found,
a different number to represent each type of closure (four-way, fault, stratigraphic or combination closure),
a number representing the total area of the closed surface, or
a number representing the maximum height of the closure;

Marking all points that are not within a closed contour with a single color or value, while different colors or values are used to represent the distance from points within the closure to the closing contour, so that points on the closing contour will have a value of zero, while those at the top of the structure will have a value representing the maximum closure;

Marking all points that are not within a closed contour with a single color or value, while different colors or values are used to represent the distance from points within the closure to the maximum closure contour, so that points on the closing contour will have a value which represent the maximum closure, while those at the top of the structure will have a value of zero;

Marking all points that are not within a closed contour with a single color or value, while different colors or values are used to mark points within the closure to represent either the closed area on which the current point sits or the volume contained between the maximum closure and the contour the current point sits on, so points on the closing contour will have a value that represents the maximum closure area or volume, while the point at the top of the structure will have a small value;

Mark all points that are not within a closed contour with a single color or value, while different colors or values are used to mark points within the closure to represent either the closed area on which the current points sits or the volume contained between the closing contour and the contour the current point sits on, so points on the closing contour will have a small value, while the point at the top of the structure will have a value that represents the maximum closure area or volume;

Marking all points that are not within a closed contour with a single color or value, while different colors or values are used to represent the distance between a point within the closed contour and the closest spill point; and Use of one color or value to represent points that are outside of a closed contour, and use of a second color or value to represent points that are within a four-way closed contour, use of a third color or value to represent points that are within a fault bounded closure, use of a fourth color or value to represent points that are within a stratigraphic bounded closure, and use of a fifth color or value to represent points that are within a combined of stratigraphic bounded and fault bounded closure.

Closure Application

When utilizing interpretation procedures known to the prior art, only a very few horizons are interpreted. As a result only a small number of the data sample points within the entire data volume are known to fall upon a particular horizon. Therefore, closure can only be determined on isolated horizons. With a geologic time volume, every data sample point in the volume is associated with at least one horizon. Therefore, by determining the closure on each horizon, every sample in the volume can be assigned a closure value as described above. Once a closure volume has been created it may be used to help determine the optimum well placement. For instance, it may be desirable to either intersect the largest, or largest number of, potential hydrocarbon traps. Volume visualization can be used on a closure volume to isolate those portions of the closure volume that are part of a closed volume that is large enough to have economic hydrocarbon accumulations. The economic significance of an oil or gas accumulation will depend upon many factors, which can change with time. As a petroleum producing region becomes more developed, a reservoir that was sub-economic can become economic because of increased pipeline availability. A reservoir that was initially sub-economic may also become economic because of an increase in the price of oil and gas.

For every contour of maximum closure, there is one or more spill points. A spill point is also referred to herein as a leak point, and is normally a location where the surface has zero dip and a relatively high curvature. If the spill points of each surface of constant geologic time are identified, they can be combined to create a spill point volume. This spill point volume could have several uses. The location and number of spill points could be useful in risking a particular prospect. They could also be useful to guide a search for where hydrocarbons might have leaked to, if upon drilling a well it is discovered that hydrocarbons have filled a particular structure to its leak point, therefore indicating that hydrocarbons probably have leaked out and might have accumulated elsewhere.

Isopach Volumes

Figure 11:
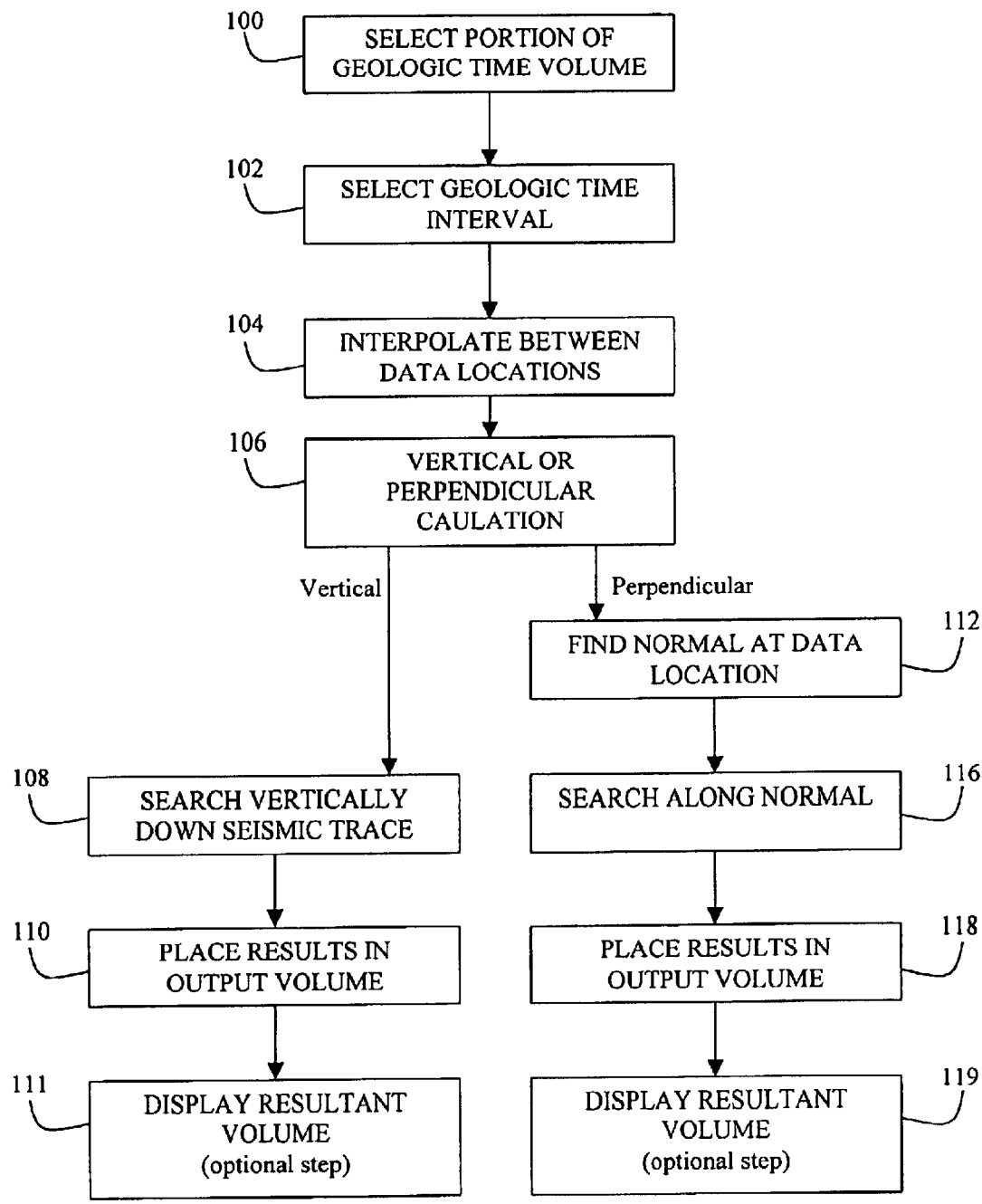
FIG. 11 is a flow diagram which outlines a process for generating an isopach volume.

Among the useful volumes that may be generated from a geologic time volume is an isopach volume. Data locations in an isopach volume may be coextensive with data locations in a geologic time volume, but the data at each data location in an isopach volume is related to the thickness of a constant geologic time interval. With reference to the flow diagram in FIG. 11, in step 100, the portion of the geologic time volume for which an isopach volume is to be generated is selected. An isopach volume may be generated corresponding to an entire geologic time volume, or the isopach volume may be calculated for only a selected part of the geologic time volume. In step 102 a constant geologic time interval value for which the isopach volume is to be calculated is selected. In generating an isopach volume it is not necessary to identify particular geologic time horizons within the volume.

In step 104 a decision is made as to whether to interpolate between data locations in the geologic time volume or to use the closest data location in the geologic time volume to a selected geologic time. Whether an interpolation is performed between data locations in a geologic time volume, to obtain the location of a geologic time not represented precisely by a data location, depends on the precision that is desired for calculating the isopach volume. Interpolation will increase the calculation time, and if utilizing the closest data location in the geologic time volume to a selected geologic time will provide sufficient precision, then a choice to use the closest data location will be computationally more efficient. The interpolation, if it is to be performed, will be done as part of either step 108 or step 116. In step 106 a decision is made as to whether the volume will be calculated vertically along a seismic data trace or perpendicular to the bedding.

Vertical Calculation

Calculating an isopach time volume vertically, rather than in a direction perpendicular to the bedding, is computationally more efficient. However, this vertical distance calculation may be performed between two geologic time points located on surfaces extending in a direction which is at an angle to the bedding, and may not be as accurate a representation of an isopach volume as a calculation along a direction which is perpendicular to the bedding. To generate the isopach using the vertical method is straightforward. The program takes the geologic time of a currently selected data location in the geologic time volume and adds to it the geologic time interval value (selected in step 102) of the desired isopach volume in order to obtain a target geologic time. In step 108, the program then searches vertically down the seismic data trace, starting with the current data location, to find the data location whose geologic time is closest to the target geologic time. In step 110, the number of samples, plus any interpolated distance, if requested, is then placed in the output volume at the data sample location corresponding to the current sample location in the geologic time volume. This process may then be repeated for each data location in the geologic time volume, or subvolume, as selected in step 100, as the case may be. In step 111, the results may optionally be displayed.

Perpendicular Calculation

In order to perform the calculation in a direction perpendicular to the bedding orientation, strike and dip values (or surface normals) must also be available in addition to the geologic time volume, in order to find the local horizon normal at each data location. (These strike and dip values may be calculated when the isopach volume is generated, or they may be taken from pre-computed volumes.) In step 112 the normal at a data location is found. Once the local normal to the surface of constant geologic time has been established, in step 116, the program searches along the normal in the direction of increasing geologic time, starting with the currently selected data sample location, to find the data sample location having a geologic time that is closest to the target geologic time. Just as in the vertical calculation, the program takes the geologic time of the current sample, adds to it the geologic time interval value selected in step 102 to obtain a target geologic time. The distance between the two samples locations is calculated, taking into account the in-line distance, the cross line distance and the time (depth) difference between the two sample locations, including any incremental interpolation distances. In step 118, this distance is then placed in the output volume at the sample location corresponding to the current sample in the geologic time volume. This procedure is repeated for every sample in the data volume, or subvolume, as selected in step 100, as the case may be. In step 119, the results may optionally be displayed.

It may be of interest to generate volumes that show only the difference in the in-line direction, the difference in the cross-line direction, or the change in seismic signal transmission time (depth) between the two sample locations. Therefore, the perpendicular calculation method could result in four new volumes instead of just one new volume as the vertical method does.

The resulting isopach volumes, regardless of whether the vertical method or the perpendicular method is used for calculating the volume, may be displayed in standard interpretation and 3D visualization packages to enable the geologic significance of the volumes to be studied. Areas of high isopach values indicate deposition centers, while thin areas may either represent starved sections or local erosion.

Changes is isopach values may also indicate differential compaction or faults.

Isopach Anomaly Volumes

An isopach anomaly volume may be more indicative of potential hydrocarbon traps in some locations than an isopach volume. For instance, in a predominantly shale section, a sand lens will not compact as much as the surrounding shale. Therefore, an isopach of the shale sequence will show a thickening in the area that contains the sand lens. In areas where shale is deposited over and around a carbonate reef, sometimes the reef location can be identified by an isopach thin, if the proper interval is taken.

The optimum calculation of an isopach anomaly volume requires an isopach volume and the corresponding geologic time volume to be processed together. A surface of constant geologic time is found in a geologic time volume. Isopach values along this constant geologic time surface are then extracted from the isopach volume. These isopach values along the constant geologic time surface are then averaged in some way to estimate a background isopach value. These isopach values may be averaged over the entire constant geologic time surface to calculate a background isopach value, or a type of spatial smoothing filter may be used. For example, spatial filtering could take the form of a 15 by 15 trace averaging patch for calculating background average isopach values. The isopach anomaly values along a particular constant geologic time surface are the difference between the isopach values and the calculated background isopach values. Methods of anomaly calculation discussed previously are applicable to the determination of isopach anomalies. Each isopach anomaly value is placed in the output volume at a location corresponding to the point on the surface of constant geologic time for which the isopach anomaly value was calculated. The constant geologic time surface may be incremented and the process repeated until the isopach anomaly volume contains a data point corresponding to each data location in the isopach volume. Because an unconformity has a range of geologic times, one location in an isopach volume, or an isopach anomaly volume, may be assigned a plurality of isopach or isopach anomaly values. In such case, the various values can either be averaged, the first one used, the last one used or a multi-value flag may be set.

Figure 12:
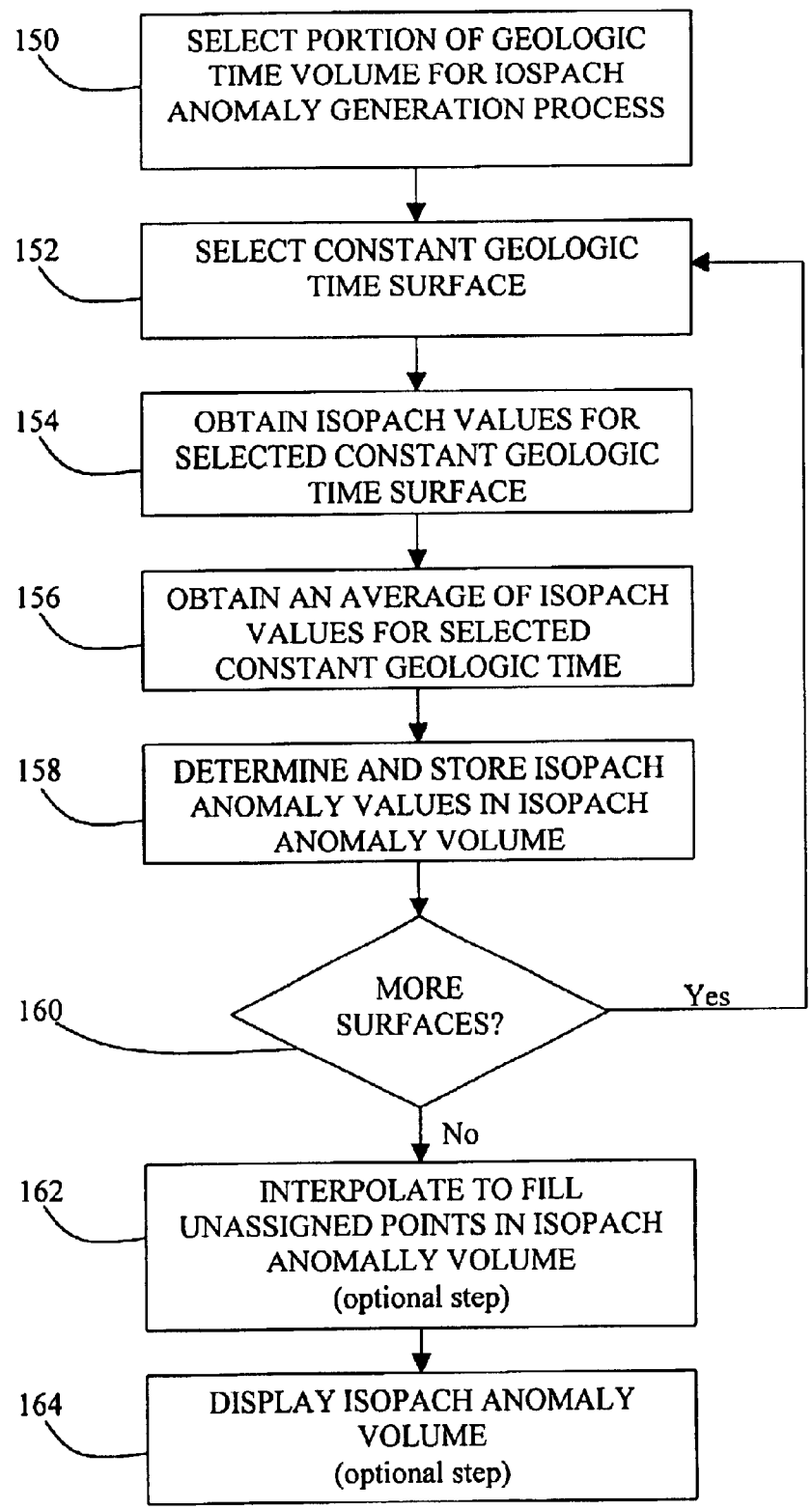
FIG. 12 is a flow diagram which outlines a process for generating an isopach anomaly volume.

FIG. 12 contains a flow diagram illustrating the steps that can be used to generate an isopach anomaly volume. In step 150 the portion of the geologic time volume to be used for the isopach anomaly calculation is selected. This might be the entire volume, or a volume that is limited by one or more of: in-line, cross line, travel time, and/or geologic time values. In step 152, a constant geologic time surface is selected. The isopach values that correspond to this surface are then obtained in step 154. These isopach values can be obtained from a pre-computed isopach volume, or computed as part of this procedure using a method similar to what has been previously described herein. However these isopach values are obtained, they are used to obtain an average isopach value in step 156. Methods for obtaining average and anomaly values have been previously discussed herein. In step 158 the isopach anomaly values for the selected surface are stored in the isopach anomaly volume. The isopach anomaly volume contains a measure of the difference between the isopach value and an average isopach value for a data point. In step 160 a question is asked as to whether or not there are any more surfaces of constant geologic time that need to be processed. An alternate question could be "are there any points in the isopach anomaly volume that have not yet been assigned a value?". Whichever question is asked, steps 152, 154, 156, and 158 are repeated until the question asked in step 160 is false. Step 162 is an optional step. If the question in 160 pertains to surfaces, there could be points in the anomaly volume that have not been assigned an anomaly value. In such a case, it may be desirable to fill in these points using interpolation. If so, then the interpolation is performed in step 162. Step 164 is another optional step, in which the resultant volume is displayed using any display technique, particularly volume visualization techniques, that can be used on geophysical data.

While the invention has been described and illustrated herein by reference to certain preferred embodiments in relation to the drawings attached hereto, various changes and further modifications, apart from those shown or suggested herein, may be made herein by those skilled in the art, without departing from the spirit of the invention, the scope of which is defined by the following claims.

I claim:

1. A method for analyzing seismic data comprising:
   selecting a geologic time volume for a subsurface region of interest;
   selecting a procedure for generating a derived data volume based on said geologic time volume;
   utilizing said selected procedure to calculate said derived data volume; and
   storing said derived data volume on a data storage medium.

2. The method of claim 1 wherein said derived data volume comprises a subsequently generated derived data volume and said procedure comprises utilizing a previously generated derived data volume based on said geologic time volume for generating said subsequently generated derived data volume.

3. The method of claim 1 wherein said data storage medium is selected from one of the following: random access memory, hard drive, CD-ROM, or tape.

4. The method of claim 1 further comprising displaying at least a portion of said derived data volume.

5. The method of claim 4 wherein said at least a portion of said derived data volume is displayed by utilizing a volume visualization method.

6. The method of claim 5 wherein an opacity function is utilized to show regions of anomalous derived values in said derived data volume.

7. The method of claim 1 wherein said derived data volume comprises a difference volume.

8. The method of claim 7 wherein said procedure comprises utilizing a previously generated derived data volume based on said geologic time volume for generating said difference volume.

9. The method of claim 8 wherein said previously generated derived data volume is selected from the following: a dip magnitude volume, a dip azimuth volume or an isopach volume.

10. The method of claim 1 wherein said derived data volume comprises a discontinuity volume.

11. The method of claim 10 wherein said procedure comprises utilizing a previously generated derived data volume based on said geologic time volume for generating said discontinuity volume.

12. The method of claim 11 wherein said previously generated derived data volume is selected from one of the following: a difference volume, a dip magnitude volume, a dip azimuth volume, or an isopach volume.

13. The method of claim 1 wherein said derived data volume comprises a fault volume.

14. The method of claim 13 wherein said procedure comprises utilizing a previously generated derived data volume based on said geologic time volume for generating said fault volume.

15. The method of claim 14 wherein said previously generated derived data volume is selected from one of the following: a discontinuity volume, a dip magnitude volume, a dip azimuth volume, or an isopach volume.

16. The method of claim 1 wherein said derived data volume comprises an unconformity volume.

17. The method of claim 16 wherein said procedure comprises utilizing a previously generated derived data volume based on said geologic time volume for generating said unconformity volume.

18. The method of claim 17 wherein said previously generated derived data volume is selected from one of the following: a discontinuity volume, a time difference volume, an isopach volume.

19. The method of claim 1 wherein said derived data volume comprises a throw volume.

20. The method of claim 19 wherein said procedure comprises determining fault locations in said geologic time volume and determining throw for said fault locations.

21. The method of claim 1 wherein said derived data volume comprises a heave volume.

22. The method of claim 21 wherein said procedure comprises determining fault locations in said geologic time volume and determining heave for said fault locations.

23. The method of claim 1 wherein said derived data volume comprises a dip magnitude volume.

24. The method of claim 23 wherein said procedure comprises utilizing a previously generated derived data volume based on said geologic time volume for generating said dip magnitude volume.

25. The method of claim 24 wherein said previously generated derived data volume is selected from the following: a heave volume, a throw volume or a difference volume.

26. The method of claim 1 wherein said derived data volume comprises a dip azimuth volume.

27. The method of claim 26 wherein said procedure comprises utilizing a previously generated derived data volume based on said geologic time volume for generating said dip azimuth volume.

28. The method of claim 27 wherein said previously generated derived data volume is selected from the following: a heave volume, a throw volume or a difference volume.

29. The method of claim 1 wherein said derived data volume comprises a strike volume.

30. The method of claim 29 wherein said procedure comprises utilizing a previously generated derived data volume based on said geologic time volume for generating said strike volume.

31. The method of claim 30 wherein said previously generated derived data volume is selected from the following: a heave volume, a throw volume or a difference volume.

32. The method of claim 1 wherein said derived data volume comprises a closure volume.

33. The method of claim 1 wherein said derived data volume comprises an isopach volume.

34. The method of claim 33 wherein said procedure for generating said isopach volume comprises utilizing at least one previously generated derived data volume based on said geologic time volume in conjunction with said geologic time volume.

35. The method of claim 34 wherein said at least one previously generated derived data volume comprises at least one of the following: a dip magnitude volume, a strike volume or a surface normal volume.

36. The method of claim 1 wherein said derived data volume comprises an isopach anomaly volume.

37. The method of claim 36 wherein said procedure for generating said isopach anomaly volume comprises utilizing said geologic time volume and a previously generated isopach volume.

38. A method for analyzing seismic data comprising:
 selecting a geologic time volume for a subsurface region of interest;
 selecting a procedure for generating a difference volume based on said geologic time volume;
 utilizing said selected procedure to calculate said difference volume; and
 storing said difference volume on a data storage medium.

39. The method of claim 38 wherein said difference volume is an in-line difference volume.

40. The method of claim 39 wherein difference values in said in-line difference volume are represented as vectors.

41. The method of claim 38 wherein said difference volume is a cross line difference volume.

42. The method of claim 38 wherein difference values in said cross line difference volume are represented as vectors.

43. The method of claim 38 wherein said difference volume is a time difference volume.

44. The method of claim 43 wherein difference values in said time difference volume are represented as vectors.

45. The method of claim 38 wherein said difference volume is a total difference magnitude volume.

46. The method of claim 45 wherein the following relationship is used to calculate values for said total difference magnitude volume:

$$\text{Total difference magnitude} = (\Delta time^2 + \Delta inline^2 + \Delta crossline^2)^{1/2},$$

in which $\Delta inline$=in-line difference,
 $\Delta crossline$=cross line difference, and
 $\Delta time$=time difference.

47. The method of claim 46 wherein difference values in said total difference magnitude volume are represented as vectors.

48. The method of claim 38 wherein said difference volume is a spatial difference magnitude volume.

49. The method of claim 48 wherein the following relationship is used to calculate values for said spatial difference magnitude volume:

$$\text{Spatial difference magnitude} = (\Delta inline^2 + \Delta crossline^2)^{1/2},$$

in which $\Delta inline$=in-line difference, and
 $\Delta crossline$=cross line difference.

50. The method of claim 49 wherein difference values in said spatial difference magnitude volume are represented as vectors.

51. The method of claim 38 wherein said difference volume is an in-line temporal difference magnitude volume.

52. The method of claim 51 wherein the following relationship is used to calculate values for said in-line temporal difference magnitude volume:

$$\text{In-line temporal difference magnitude} = (\Delta time^2 + \Delta inline^2)^{1/2},$$

in which $\Delta inline$=in-line difference, and
 $\Delta time$=time difference.

53. The method of claim 52 wherein difference values in said in-line temporal difference magnitude volume are represented as vectors.

54. The method of claim 38 wherein said difference volume is a cross line temporal difference volume.

55. The method of claim 54 wherein the following relationship is used to calculate values for said cross line temporal difference volume:

Cross line temporal difference magnitude=$(\Delta time^2 + \Delta crossline^2)^{1/2}$ in which $\Delta crossline$=cross line difference, and
$\Delta time$=time difference.

56. The method of claim 55 wherein difference values in said cross line temporal difference magnitude volume are represented as vectors.

57. The method of claim 38 wherein said difference volume is an azimuth of the total difference magnitude volume.

58. The method of claim 57 wherein the following relationship is used to calculate values for said azimuth of the total difference magnitude volume:

$$\text{Azimuth of the total difference magnitude} = \text{inverse tangent of } \frac{\Delta\,crossline}{\Delta\,inline}$$

in which $\Delta inline$=in-line difference, and
$\Delta crossline$=cross line difference.

59. The method of claim 38 wherein said difference volume is an inclination of the total difference magnitude volume.

60. The method of claim 59 wherein the following relationship is used to calculate values for said inclination of the total difference magnitude volume:

Inclination of the total difference magnitude $$\text{Inclination of the total difference magnitude} = \text{inverse cosine of } \frac{\Delta\,time}{(\Delta\,time^2 + \Delta\,inline^2 + \Delta\,crossline^2)^{1/2}}.$$

61. The method of claim 38 further comprising identifying locations of anomalous difference values in said difference volume.

62. A method for generating a difference volume based on a portion of a geologic time volume, comprising:
selecting a portion of a geologic time volume for a subsurface region of interest;
selecting a method for calculating geologic time differences between data points in said geologic time volume;
selecting a sign convention for representing said calculated geological time differences;
select difference values to be calculated;
calculating said selected difference values over said selected portion of said geologic time volume; and
storing said calculated difference values on a data storage medium; thereby generating said difference volume.

63. The method of claim 62 further comprising identifying locations of anomalous difference values in said difference volume.

64. A method for analyzing seismic data comprising:
selecting a geologic time volume for a subsurface region of interest;
selecting a procedure for generating a discontinuity volume based on said geologic time volume;
utilizing said selected procedure to calculate said discontinuity volume; and
storing said discontinuity volume on a data storage medium.

65. The method of claim 64 wherein said procedure comprises utilizing a derived data volume based on said geologic time volume and subtracting derived values in said derived data volume from local average derived value in said derived data volume to emphasize anomalous values.

66. The method of claim 65 wherein said derived values are difference values.

67. The method of claim 64 further comprising identifying unconformity locations in said discontinuity volume.

68. The method of claim 67 wherein unconformities are identified as anomalous discontinuity locations which are spatially continuous and predominantly horizontal.

69. The method of claim 67 further comprising utilizing said identified unconformity locations to generate an unconformity volume.

70. The method of claim 64 further comprising identifying fault locations in said discontinuity volume.

71. The method of claim 70 wherein fault locations are identified as anomalous discontinuity locations which are spatially continuous and predominantly vertical.

72. The method of claim 70 further comprising utilizing said identified fault locations to generate a fault volume.

73. A method for analyzing seismic data comprising:
selecting a geologic time volume for a subsurface region of interest;
selecting a procedure for generating an unconformity volume based on said geologic time volume;
utilizing said selected procedure to calculate said unconformity volume; and
storing said unconformity volume on a data storage medium.

74. The method of claim 73 wherein said procedure comprises utilizing a previously generated derived data volume based on said geologic time volume for generating said discontinuity volume.

75. The method of claim 74 wherein said previously generated derived data volume is selected from one of the following: a difference volume, a discontinuity volume, a dip volume, a dip azimuth volume, an isopach volume, or a volume with fault points removed.

76. The method of claim 75 wherein said difference volume is a time difference volume.

77. The method of claim 73 wherein data points in said unconformity volume represent an aspect of an unconformity.

78. The method of claim 77 wherein said aspect is the existence of an unconformity.

79. The method of claim 77 wherein said aspect is the quality of the unconformity pick.

80. The method of claim 73 wherein unconformities are identified as anomalous discontinuity locations which are spatially continuous and predominantly horizontal.

81. The method of claim 80 wherein visual identification is utilized to identify unconformity locations.

82. The method of claim 81 wherein said visual identification comprises visual identification utilizing color lookup tables.

83. The method of claim 81 wherein visual identification comprises utilizing volume visualization with opacity filtering.

84. The method of claim 80 wherein identifying unconformities comprises visual identification of unconformity locations and user interaction techniques.

85. The method of claim 84 wherein said user interaction techniques comprise digitizing anomalous points.

86. The method of claim 84 wherein said user interaction techniques comprise using polyhedrons to isolate anomalous opacity regions.

87. The method of claim 84 wherein said user interaction techniques comprise seed tracking techniques.

88. The method of claim 84 wherein said user interaction techniques comprise voxel tracking techniques.

89. The method of claim 80 wherein identifying unconformities comprises numerical filtering to isolate unconformity data positions from non-unconformity data positions.

90. The method of claim 80 further comprising removing identified unconformity points from a volume used to identify unconformity points, thereby generating a data volume from which unconformity locations have been removed and utilizing said data volume from which unconformity locations have been removed to generate a fault volume.

91. A method for analyzing seismic data comprising:
selecting a geologic time volume for a subsurface region of interest;
selecting a procedure for generating a fault volume based on said geologic time volume;
utilizing said selected procedure to calculate said fault volume; and
storing said fault volume on a data storage medium.

92. The method of claim 91 wherein said procedure comprises utilizing a previously generated derived data volume based on said geologic time volume for generating said fault volume.

93. The method of claim 92 wherein said previously generated derived data volume is selected from one of the following: a difference volume, a discontinuity volume, a dip volume, a dip azimuth volume, an isopach volume, or a volume with unconformity points removed.

94. The method of claim 93 wherein said previously generated derived data volume is a spatial difference magnitude discontinuity volume, and the following relationship is used to calculate values for said spatial difference magnitude discontinuity volume:

spatial difference magnitude discontinuity=spatial difference magnitude−average spatial difference magnitude; and spatial difference magnitude=$(\Delta inline^2+\Delta crossline^2)^{1/2}$, in which $\Delta inline$=in-line difference, and
$\Delta crossline$=cross line difference.

95. The method of claim 91 wherein fault locations are identified as anomalous discontinuity locations which are spatially continuous and predominantly vertical.

96. The method of claim 95 wherein visual identification is utilized to identify fault locations.

97. The method of claim 96 wherein said visual identification comprises visual identification utilizing color lookup tables.

98. The method of claim 96 wherein said visual identification comprises utilizing volume visualization with opacity filtering.

99. The method of claim 96 wherein said procedure comprises:
selecting test points in said geologic time volume;
specifying a threshold value for the geologic time difference between a test point and a candidate point to use in determining if the geologic time of a candidate point is substantially equal to the geologic time of a test point;
specifying a search space relative to a test point;
specifying a "did not find" value to indicate that no candidate point is found in the specified search space relative to a test point for which the geologic time is within said threshold value;
for each test point, searching within the specified search space relative to the test point for the candidate point having the closest geologic time to the geologic time of the test point;
for each test point for which a candidate point is found having a geologic time that differs from the geologic time of the test point by no more than said threshold value, assigning the vertical separation between the test point and the candidate point having the closest geologic time to the geologic time of the test point to a location in a throw volume corresponding to said test point location, and assigning the horizontal separation between the test point and the candidate point having the closest geologic time to the geologic time of the test point to a location in a heave volume corresponding to said test point location; and
for each test point for which no candidate point is found having a geologic time that differs from the geologic time of the test point by no more than said threshold value, assigning said "did not find" value to locations in said throw volumes and said heave volumes, corresponding to said test point location.

100. The method of claim 99 wherein said search space is in the in-line direction and includes both a time range and a cross line trace range relative to a selected test point.

101. The method of claim 99 wherein said search space is in the cross line direction and includes both a time range and an in-line trace range relative to a selected test point.

102. The method of claim 99 wherein said search space is in the in-line direction and includes both a time range and a selected trace distance relative to a selected test point.

103. The method of claim 99 wherein said search space is in the cross line direction and includes both a time range and a selected trace distance relative to a selected point.

104. The method of claim 99 wherein said search space includes a time range, an in-line range, and a cross line range all relative to a selected test point.

105. The method of claim 104 wherein said procedure further comprises calculating and storing an in-line heave value, a cross line heave value, and a throw value for the separation between the test point and the closest candidate point.

106. The method of claim 99 wherein said test points comprise substantially all data points in said geologic time volume.

107. The method of claim 99 wherein said test points are limited substantially to test points at identified fault locations.

108. The method of claim 99 wherein said procedure is performed in an in-line and a cross line direction, said procedure further comprising:
calculating throw magnitude and throw azimuth from in-line and cross line throw values;
calculating heave magnitude and heave azimuth from in-line and cross line heave values; and
calculating total displacement vectors from the in-line heave, in-line throw, cross line heave, and cross line throw values.

109. The method of claim 99 further comprising creating an other derived data volume by storing the geologic time difference between the "closest" candidate point and the test point in the corresponding test point locations in said other derived volume.

110. The method of claim 99 further comprising creating an other derived data volume by storing the location of the candidate point that is "closest" to the test point in the corresponding test point locations in said other derived volume.

111. The method of claim 95 wherein identifying faults comprises visual identification of fault locations and user interaction techniques.

112. The method of claim 111 wherein said user interaction techniques comprise digitizing anomalous points.

113. The method of claim 111 wherein said user interaction techniques comprise using polyhedrons to isolate anomalous opacity regions.

114. The method of claim 111 wherein said user interaction techniques comprise seed tracking techniques.

115. The method of claim 111 wherein said user interaction techniques comprise voxel tracking techniques.

116. The method of claim 95 wherein identifying faults comprises numerical filtering to isolate fault data points from non-fault data points.

117. The method of claim 95 further comprising removing identified fault points from a volume used to identify fault points, thereby generating a data volume from which fault locations have been removed and utilizing said data volume from which fault locations have been removed to generate an unconformity volume.

118. The method of claim 91 wherein data points in said fault volume represent an aspect of a fault.

119. The method of claim 118 wherein said aspect is the existence of a fault.

120. The method of claim 118 wherein said aspect is the quality of the fault pick.

121. A method for analyzing seismic data comprising:
selecting a geologic time volume for a subsurface region of interest;
calculating throw values and heave values within said geologic time volume in an in-line direction;
calculating throw values and heave values within said geologic time volume in a cross line direction;
combining said calculated throw and heave values to create in-line displacement vectors;
combining said calculated throw and heave values to create cross line displacement vectors;
forming vector cross products of the in-line displacement vectors and the cross line displacement vectors to generate surface normal vectors; and
storing said surface normal vectors in a surface normal vector volume.

122. A method for analyzing seismic data comprising:
selecting a geologic time volume for a subsurface region of interest;
calculating throw values and heave values within said geologic time volume in an in-line direction;
calculating throw values and heave values within said geologic time volume in a cross line direction;
calculating throw magnitude and throw azimuth values from the in-line throw and cross line throw values;
calculating heave magnitude and heave azimuth values from the in-line heave and cross line heave values; and
storing said throw magnitude and throw azimuth in a throw magnitude and azimuth volume and storing said heave magnitude and heave azimuth in a heave magnitude and azimuth volume.

123. A method for analyzing seismic data comprising:
selecting a geologic time volume for a subsurface region of interest;
selecting a procedure for generating a throw volume based on said geologic time volume;
utilizing said selected procedure to calculate said throw volume; and
storing said throw volume on a data storage medium.

124. A method for analyzing seismic data comprising:
selecting a geologic time volume for a subsurface region of interest;
selecting a procedure for generating a heave volume based on said geologic time volume;
utilizing said selected procedure to calculate said heave volume; and
storing said heave volume on a data storage medium.

125. A method for analyzing seismic data comprising:
selecting a geologic time volume for a subsurface region of interest;
selecting a procedure for generating a throw volume and a heave volume based on said geologic time volume;
utilizing said selected procedure to calculate said throw volume and said heave volume; and
storing said throw volume and heave volume on a data storage medium.

126. The method of claim 125 wherein said procedure comprises calculating throw values and heave values within said geologic time volume in an in-line direction.

127. The method of claim 126 wherein said procedure further comprises combining said calculated throw and heave values to create in-line displacement vectors.

128. The method of claim 113 wherein said procedure comprises calculating throw values and heave values within said geologic time volume in a cross line direction.

129. The method of claim 128 wherein said procedure further comprises combining said calculated throw and heave values to create cross line displacement vectors.

130. The method of claim 125 wherein said procedure comprises calculating throw values and heave values within said geologic time volume in an in-line direction and in a cross line direction.

131. The method of claim 130 wherein said procedure further comprises combining said calculated in-line heave and throw values to create in-line vectors, combining said cross line heave and throw values to create cross line displacement vectors, and forming vector cross products of the in-line displacement vector and the cross line displacement vector to generate surface normal vectors and storing said surface normal vectors in a surface normal vector volume.

132. The method of claim 130 further comprising utilizing said throw and heave volumes for generating at least one new derived data volume.

133. The method of claim 132 wherein said at least one new derived data volume is selected from one of the following; a throw magnitude volume, a throw azimuth volume, a heave magnitude volume, a heave azimuth volume, a total displacement magnitude volume, or a surface normal volume.

134. The method of claim 125 wherein said procedure comprises calculating throw values and heave values along a selected direction through said geologic time volume.

135. The method of claim 125 wherein said procedure comprises calculating throw values and heave values along a first selected direction through said geologic time volume, and along a second selected direction through said geologic time that is perpendicular to the first selected direction.

136. The method of claim 125 wherein said procedure comprises:
   calculating throw values and heave values along a plurality of selected directions through said geologic time volume to create a plurality of throw and heave values associated with data points in said geologic time volume; and
   combining said throw and heave values calculated along a plurality of selected directions for each data point to obtain an estimate of the local geologic time surface orientation.

137. The method of claim 125 wherein said procedure comprises:
   selecting data points in said geologic time volume;
   for each selected data points, searching within said specified geologic time volume to find a location having substantially the same geologic time as the geologic time of the selected data point; and
   for each selected data point for which a location is found having substantially the same geologic time as the geologic time of the selected data point, assigning the vertical separation between the selected data point and said found location to a location in a throw volume corresponding to said selected point and assigning the horizontal separation between the data point and said found point to a location in a heave volume corresponding to said selected point.

138. The method of claim 137 wherein said searching comprises identifying a plurality of candidate data points in said geologic time volume having geologic times closest to the geologic time of a selected data point and utilizing interpolation procedures to determine a location in said geologic time volume having a geologic time substantially equal to the geologic time of the selected data point.

139. The method of claim 138 wherein said searching is performed within a specified search space with respect to a selected data point.

140. A method for interpreting seismic data, comprising:
   selecting a geologic time volume for a subsurface region of interest;
   selecting data points in said geologic time volume;
   specifying a search space with respect to a data point;
   for each selected data point, searching within the specified search space with respect to said selected data point to find a location having substantially the same geologic time as the geologic time of the selected data point;
   for each selected data point, assigning the vertical separation between the data point and said found location to a corresponding data point location in a throw volume, and assigning the horizontal separation between the data point and said found location to a corresponding data point location in a heave volume.

141. A method for analyzing seismic data comprising:
   selecting a subsurface region of interest;
   selecting a procedure for generating a dip volume based on a geologic time volume from said subsurface region of interest;
   utilizing said selected procedure to calculate said dip volume; and
   storing said dip volume on a data storage medium.

142. The method of claim 141 wherein said procedure comprises:
   obtaining at least one derived data volume based on said geologic time volume and utilizing said derived data volume for generating said dip volume.

143. The method of claim 141 wherein dip comprises dip magnitude and dip azimuth.

144. The method of claim 141 wherein said procedure comprises:
   obtaining heave and throw volumes based on said geologic time volume;
   utilizing in-line heave and in-line throw values from said heave and throw volumes to obtain in-line dip values;
   utilizing cross line heave and cross line throw values to obtain cross line dip values; and
   calculating dip and dip azimuth values from said in-line dip and said cross line dip values.

145. The method of claim 144 wherein said procedure utilizes the following relationship for calculating dip magnitude:

$$\text{dip magnitude} = ((\text{inlinedip})^2 + (\text{crosslinedip})^2)^{1/2}, \text{ and}$$

wherein said procedure utilizes the following relationship for calculating dip azimuth:

$$\text{dip azimuth} = \arctan(\text{in line dip}/\text{dip magnitude}, \text{cross line dip}/\text{dip magnitude}).$$

146. The method of claim 141 wherein said procedure comprises:
   obtaining in-line and cross line difference volumes based on said geologic time volume;
   utilizing in-line difference values from said in-line difference volume to obtain in-line dip values;
   utilizing cross line difference values from said cross line difference volume to obtain cross line dip values; and
   calculating dip and dip azimuth values from said in-line dip and said cross line dip values.

147. The method of claim 146 wherein said procedure utilizes the following relationship for calculating dip magnitude:

$$\text{dip magnitude} = ((\text{inlinedip})^2 + (\text{crosslinedip})^2)^{1/2}, \text{ and}$$

wherein said procedure utilizes the following relationship for calculating dip azimuth:

$$\text{dip azimuth} = \arctan(\text{in line dip}/\text{dip magnitude}, \text{cross line dip}/\text{dip magnitude}).$$

148. A method for analyzing seismic data comprising:
   selecting a subsurface region of interest;
   selecting a procedure for generating a strike volume based on a geologic time volume from said subsurface region of interest;
   utilizing said selected procedure to calculate said strike volume; and
   storing said strike volume on a data storage medium.

149. The method of claim 148 wherein said procedure utilizes the following relationship for calculating strike:

$$\text{strike} = \text{dip azimuth} - 90 \text{ degrees}.$$

150. A method for analyzing seismic data comprising:
   selecting a geologic time volume for a subsurface region of interest;
   selecting a procedure for generating a closure volume based on said geologic time volume;
   utilizing said selected procedure to calculate said closure volume; and
   storing said closure volume on a data storage medium.

151. The method of claim 150 wherein said procedure comprises:
successively selecting surfaces of constant geologic time in a geologic time volume;
detecting presence of closed contours on said successively selected surfaces of constant geologic time;
assigning at least one closure value to each data point on said surface of constant geologic time based on a relationship of said data point to said closed contours; and
storing each said closure value on a data storage medium, thereby creating a closure volume.

152. The method of claim 151 wherein a selected closure value is assigned to data points in said surface of constant geologic time identified as being within a closed contour and a different closure value is assigned to all other points.

153. The method of claim 151 wherein points within each identified closure are assigned a different closure value.

154. The method of claim 151 wherein points within different types of closures are assigned a different closure value.

155. The method of claim 154 wherein said different types of closures include stratigraphic closures, four-way closures, fault closures, and combination closures.

156. The method of claim 151 wherein the closure value assigned to a data point is related to the distance the data point is from the deepest closing contour of a closure.

157. The method of claim 151 wherein the closure value assigned to a data point is related to the distance the data point is from the shallowest closing contour of a closure.

158. The method of claim 151 wherein the closure value assigned to a data point is related to the closed area on with the data point is positioned.

159. The method of claim 151 wherein the closure value assigned to a data point is related to the volume contained between the maximum closure and the contour on which the data point is positioned.

160. The method of claim 151 wherein the closure value assigned to a data point is related to the volume contained between the closing contour and the contour on which the data point is positioned.

161. The method of claim 151 wherein the closure value assigned to a data point is related to the distance the data point is from the closest spill point of said closure.

162. The method of claim 151 wherein surfaces of constant geologic time are extracted from a portion of a geologic time volume.

163. The method of claim 162 wherein said portion of a geologic time volume is limited by at least one of the following: an in-line range, a cross line range, a travel time range, a depth range, or a geologic time range.

164. The method of claim 151 wherein said surfaces of constant geologic time are interpreted horizons stored in an interpretation database.

165. The method of claim 151 wherein said surfaces of constant geologic time are surfaces obtained from an automatic tracking algorithm.

166. The method of claim 151 wherein said data storage medium is the random access memory used by a visualization program.

167. The method of claim 151 wherein said procedure further comprising filling in unassigned data points in the closure volume based on interpolated values from surrounding assigned data points.

168. The method of claim 150 further comprising using the generated closure volume in determining the location to drill a well.

169. The method of claim 150 further comprising utilizing a volume visualization method to display said closure volume.

170. A method for analyzing seismic data comprising:
selecting a geologic time volume for a subsurface region of interest;
selecting a procedure for generating a spill point volume based on said geologic time volume;
utilizing said selected procedure to calculate said spill point volume; and
storing said spill point volume on a data storage medium.

171. A method for analyzing seismic data comprising:
selecting a geologic time volume for a subsurface region of interest;
selecting a procedure for generating an isopach volume based on said geologic time volume;
utilizing said selected procedure to calculate said isopach volume; and
storing said isopach volume on a data storage medium.

172. The method of claim 171 wherein said procedure comprises:
selecting a portion of a said geologic time volume;
selecting a geologic time interval value over which an isopach volume is to be calculated;
searching along a selected direction from selected data locations within said selected portion of said geologic time volume to find a second location for which the geologic time interval between a selected location and a second location is substantially equal to said selected geologic time interval; and
for each selected data location, placing the distance between the selected data location and the found second location into a storage volume at a data storage location corresponding to said selected data location.

173. The method of claim 172 wherein said portion of a geologic time volume is limited by at least one of the following: an in-line range, a cross line range, a travel time range, a depth range, or a geologic time range.

174. The method of claim 172 wherein said selected direction is vertical from said selected data location.

175. The method of claim 172 wherein said selected direction is perpendicular to the bedding orientation at said selected data location.

176. The method of claim 172 further comprising displaying said isopach volume.

177. The method of claim 172 wherein finding a second location includes utilizing interpolation techniques to estimate the second location between data sample points.

178. A method for analyzing seismic data comprising:
selecting a geologic time volume for a subsurface region of interest;
selecting a procedure for generating an isopach anomaly volume based on said geologic time volume;
utilizing said selected procedure to calculate said isopach anomaly volume; and
storing said isopach anomaly volume on a data storage medium.

179. A method for generating an isopach anomaly volume for a subsurface region interest, comprising:
selecting a portion of a geologic time volume for said subsurface region of interest;
successively selecting surfaces of constant geologic time from said portion of said geologic time volume
obtaining isopach values for data points on said selected surfaces of constant geologic time;

obtaining average isopach values for said surfaces of constant geologic time;

comparing isopach values for said data points with said average values to determine isopach anomaly values for said data points; and storing said isopach anomaly values in an isopach anomaly volume.

180. The method of claim 179 wherein said portion of a geologic time volume is limited by at least one of the following: an in-line range, a cross line range, a travel time range, a depth range, or a geologic time range.

181. A digital computer programmed to perform a process comprising the steps of:

selecting a geologic time volume for a subsurface region of interest;

selecting a procedure for generating a derived data volume based on said geologic time volume;

utilizing said selected procedure to calculate said derived data volume; and storing said derived data volume on a data storage medium.

182. A device which is readable by a digital computer having instructions defining the following process and instructions to the computer to perform said process:

selecting a geologic time volume for a subsurface region of interest;

selecting a procedure for generating a derived data volume based on said geologic time volume;

utilizing said selected procedure to calculate said derived data volume; and storing said derived data volume on a data storage medium.

* * * * *